United States Patent
Qu et al.

(10) Patent No.: US 11,252,747 B2
(45) Date of Patent: Feb. 15, 2022

(54) COMMUNICATION METHOD AND DEVICE

(71) Applicant: HUAWEI TECHNOLOGIES CO., LTD., Guangdong (CN)

(72) Inventors: Bingyu Qu, Beijing (CN); Hao Sun, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 101 days.

(21) Appl. No.: 16/750,397

(22) Filed: Jan. 23, 2020

(65) Prior Publication Data
US 2020/0163105 A1    May 21, 2020

Related U.S. Application Data

(63) Continuation of application No. PCT/CN2018/097086, filed on Jul. 25, 2018.

(30) Foreign Application Priority Data

Aug. 11, 2017   (CN) .......................... 201710687270.8

(51) Int. Cl.
*H04W 72/04* (2009.01)
*H04W 72/12* (2009.01)
(Continued)

(52) U.S. Cl.
CPC ....... *H04W 72/1268* (2013.01); *H04L 5/0055* (2013.01); *H04L 27/2607* (2013.01);
(Continued)

(58) Field of Classification Search
CPC combination set(s) only.
See application file for complete search history.

(56) References Cited

U.S. PATENT DOCUMENTS

2011/0216713 A1    9/2011   Kim et al.
2013/0208692 A1*   8/2013   Seo ....................... H04L 1/1829
                                                        370/329
(Continued)

FOREIGN PATENT DOCUMENTS

CN        101227717 A    7/2008
CN        101478371 A    7/2009
(Continued)

OTHER PUBLICATIONS

Office Action issued in Chinese Application No. 201710687270.2 dated Jan. 14, 2021, 4 pages.
(Continued)

*Primary Examiner* — Mansour Oveissi
(74) *Attorney, Agent, or Firm* — Fish & Richardson P.C.

(57) ABSTRACT

A communication method and a device are provided, to properly utilize resources. The communication method includes: configuring, by a network device M first channels in a first time unit for a terminal, indicating, by the network device, N second channels in the first time unit to the terminal by using a downlink control channel, where the second channel is used to send second acknowledgement information and second scheduling request information in the first time unit, a quantity of first channels is M, M+N is greater than or equal to 2×B, M is less than N, the second acknowledgement information is an element in a second acknowledgement information set, B is a quantity of elements in the second acknowledgement information set.

20 Claims, 9 Drawing Sheets

(51) Int. Cl.
    *H04L 5/00*    (2006.01)
    *H04L 27/26*    (2006.01)
    *H04W 80/08*    (2009.01)

(52) U.S. Cl.
    CPC ..... *H04W 72/042* (2013.01); *H04W 72/0446* (2013.01); *H04W 72/0453* (2013.01); *H04W 80/08* (2013.01)

(56) References Cited

U.S. PATENT DOCUMENTS

| | | | |
|---|---|---|---|
| 2016/0094996 A1 | 3/2016 | Xiong et al. | |
| 2020/0177424 A1* | 6/2020 | Noh | H04W 72/0413 |

FOREIGN PATENT DOCUMENTS

| | | | |
|---|---|---|---|
| CN | 102098151 A | 6/2011 | |
| CN | 102857325 A | 1/2013 | |
| CN | 103391152 A | 11/2013 | |
| CN | 106664520 A | 5/2017 | |
| CN | 106877986 A | 6/2017 | |
| EP | 3101819 A1 | 12/2016 | |
| WO | 2018204347 A1 | 11/2018 | |

OTHER PUBLICATIONS

Ericsson, "Summary of e-mail discussions on uplink control signaling," 3GPP TSG-RAN WG1 #87, R1-1613162, Reno, NV, USA, Nov. 14-18, 2016, 24 pages.

Ericsson, "On the Design of 1-Symbol PUCCH for 1-2 bits UCI," 3GPP TSG RAN WG1 #89, R1-1709080, Hangzhou, China, May 15-19, 2017 (May 7, 2017), 7 pages.

Extended European Search Report issued in European Application No. 18845110.8 dated Jul. 1, 2020, 14 pages.

Nokia et al., "On the short PUCCH design for small UCI payloads," 3GPP TSG RAN WG1 NR Ad-Hoc #2, R1-1710893, Qingdao, P.R. China, Jun. 27-30, 2017, 4 pages.

Office Action issued in Chinese Application No. 201710687270.8 dated Apr. 23, 2020, 17 pages (with English translation).

Panasonic, "Discussion on 1-symbol NR-PUCCH for UCI of up to 2 bits," 3GPP TSG RAN WG1 NR Ad-Hoc #2, R1-1711649, Qingdao, P.R. China, Jun. 27-30, 2017, 9 pages.

PCT International Search Report and Written Opinion issued in International Application No. PCT/CN2018/097086 dated Oct. 23, 2018, 11 pages (with English translation).

\* cited by examiner

COMMUNICATION METHOD AND DEVICE

CROSS-REFERENCE TO RELATED APPLICATIONS

This application is a continuation of International Application No. PCT/CN2018/097086, filed on Jul. 25, 2018, which claims priority to Chinese Patent Application No. 201710687270.8, filed on Aug. 11, 2017. The disclosures of the aforementioned applications are hereby incorporated by reference in their entireties.

TECHNICAL FIELD

This application relates to the field of communications technologies, and in particular, to a communication method and a device.

BACKGROUND

In a long term evolution (LTE) system, a terminal may need to simultaneously send an acknowledgement (ACK)/a negative acknowledgement (NACK) and a scheduling request (SR). In this case, to maintain a low peak to average power ratio (PAPR), the SR is carried in a manner of channel selection in the LTE system. To be specific, if the terminal sends an ACK/a NACK on an SR channel, it indicates that the terminal sends an SR at the same time. If the terminal sends an ACK/a NACK on an ACK channel/a NACK channel, it indicates that the terminal sends no SR. Therefore, to cope with a case in which the terminal simultaneously sends an ACK/a NACK and an SR, a quantity of ACK/NACK channels reserved for the terminal needs to be the same as a quantity of SR channels reserved for the terminal in the LTE system. Generally, one SR channel and one ACK/NACK channel are reserved for one terminal. In this way, the terminal may send an ACK/a NACK through the ACK/NACK channel when no SR needs to be sent, may send an SR through the SR channel when no ACK/NACK needs to be sent, or may send an ACK/a NACK through the SR channel when both an SR and an ACK/a NACK need to be sent.

In a fifth generation mobile communications technology (5G) new radio (NR) system, how to configure an SR channel and an ACK/a NACK channel for a terminal to properly utilize resources becomes an issue that urgently needs to be resolved.

SUMMARY

Embodiments of this application provide a communication method and a device, to properly utilize resources.

According to a first aspect, a communication method is provided. The method may be performed by a network device. For example, the network device is a base station. The method includes: when the network device has configured a first channel in a first time unit for a terminal, indicating, by the network device, N second channels in the first time unit to the terminal by using a downlink control channel, where the second channel is used to send second acknowledgement information and second scheduling request information in the first time unit, a quantity of first channels is M. M+N is greater than or equal to 2×B, M is a positive integer, M is less than N, the second acknowledgement information is an element in a second acknowledgement information set, B is a quantity of elements in the second acknowledgement information set, the second scheduling request information indicates that a scheduling request exists or no scheduling request exists, the second acknowledgement information set includes acknowledgement information indicating a data receiving state, any one of the M first channels is different from any one of the N second channels, there is a time-domain overlapping part between a time-frequency resource of the first channel and a time-frequency resource of the second channel in the first time unit, the first channel is used to indicate first scheduling request information in the first time unit, or the first channel is used to indicate the first scheduling request information and send first acknowledgement information in the first time unit, M is a positive integer, the first scheduling request information indicates that a scheduling request exists or no scheduling request exists, the first acknowledgement information is an element in a first acknowledgement information set, and the first acknowledgement information set includes acknowledgement information indicating a data receiving state; and detecting, by the network device, the first channel and/or the second channel.

Correspondingly, according to a second aspect, a communication method is provided. The method may be performed by a terminal. The method includes: when a network device has configured a first channel in a first time unit for the terminal, determining, by the terminal by using a downlink control channel, N second channels in the first time unit that are indicated by the network device to the terminal, where the second channel is used to send second acknowledgement information and second scheduling request information in the first time unit, a quantity of first channels is M, M+N is greater than or equal to 2×B, M is less than N, the second acknowledgement information is an element in a second acknowledgement information set, B is a quantity of elements in the second acknowledgement information set, the second scheduling request information indicates that a scheduling request exists or no scheduling request exists, the second acknowledgement information set includes acknowledgement information indicating a data receiving state, any one of the M first channels is different from any one of the N second channels, there is a time-domain overlapping part between a time-frequency resource of the first channel and a time-frequency resource of the second channel in the first time unit, the first channel is used to indicate first scheduling request information in the first time unit, or the first channel is used to indicate the first scheduling request information and send first acknowledgement information in the first time unit, M is a positive integer, the first scheduling request information indicates that a scheduling request exists or no scheduling request exists, the first acknowledgement information is an element in a first acknowledgement information set, and the first acknowledgement information set includes acknowledgement information indicating a data receiving state; and selecting, by the terminal, one channel from the M first channels or the N second channels based on generated scheduling request information and acknowledgement information, and sending the selected channel.

In the embodiments of this application, the network device configures the N second channels and the M first channels for the terminal, and M is less than N, that is, the quantity of first channels configured by the network device is less than a quantity of second channels configured by the network device. The second channel is used to send the second acknowledgement information and the second scheduling request information. The first channel is used to indicate the first scheduling request information, or is used to indicate the first scheduling request information and send the first acknowledgement information. It can be considered that the first channel is an SR resource, and the second channel is configured by the network device by using the downlink control channel, that is, the second channel can be dynamically scheduled. Therefore, according to the solution provided in the embodiments of this application, when a relatively small quantity of terminals need to simultaneously transmit an ACK/a NACK and an SR, the second channel may be scheduled for another purpose, and a relatively small quantity of first channels are configured, that is, reserved SR resources are reduced, and resource waste is also generally reduced. This can save resources to a relatively large extent, and implement relatively proper resource utilization.

In a possible design, the second acknowledgement information set is {N, A} or {(N, N), (N, A), (A, N), (A, A)}, N indicates a NACK, and A indicates an ACK.

The second acknowledgement information is information sent through the second channel, and the second channel can be considered as an ACK/a NACK resource. Therefore, if the second acknowledgement information is acknowledgement information for a data block group, two corresponding states are N and A, that is, the second acknowledgement information set is {N, A}; or if the second acknowledgement information is acknowledgement information for two data block groups, there are four corresponding states: (N, N), (N, A), (A, N), and (A, A), that is, the second acknowledgement information set is {(N, N), (N, A), (A, N), (A, A)}.

In a possible design, the first acknowledgement information set is {N} or {(N, N)}, and N indicates a NACK The first acknowledgement information is information sent on the first channel, and the first channel is an SR resource. Therefore, a state N of acknowledgement information for a data block group is usually allocated to the first channel, that is, if the first acknowledgement information is acknowledgement information for a data block group, a corresponding state is {N}; or if the first acknowledgement information is acknowledgement information for two data block groups, a corresponding state is {(N, N)}.

In a possible design, M=1.

To be specific, the network device may configure one first channel for the terminal, and a relatively small quantity of first channels are configured. That is, reserved SR resources are reduced, and resource waste is also generally reduced. This can save resources to a relatively large extent, and implement relatively proper resource utilization.

In a possible design, the configuring, by the network device, the M first channels for the terminal includes: configuring, by the network device, the M first channels for the terminal by using higher layer signaling. Correspondingly, the determining, by the terminal, the M first channels configured by the network device includes: determining, by the terminal by receiving higher layer signaling, the M first channels configured by the network device for the terminal.

A manner of configuring, by the network device, the first channel for the terminal is described. Certainly, the manner of configuring, by the network device, the first channel for the terminal is not limited in the embodiments of this application.

In a possible design, when the network device configures no first channel for the terminal in the first time unit, the network device may indicate C third channels in the first time unit to the terminal by using the downlink control channel, where the C third channels are a proper subset of the N second channels, the third channel is used to send third acknowledgement information in the first time unit, the third acknowledgement information is an element in a third acknowledgement information set, the third acknowledgement information set includes acknowledgement information indicating a data receiving state, and C is a positive integer; and the network device detects the third channel. Correspondingly, when the network device configures no first channel for the terminal in the first time unit, the terminal determines, by using the downlink control channel, C third channels in the first time unit that are indicated by the network device to the terminal, where the C third channels are a proper subset of the N second channels, the third channel is used to send third acknowledgement information in the first time unit, the third acknowledgement information is an element in a third acknowledgement information set, the third acknowledgement information set includes acknowledgement information indicating a data receiving state, and C is a positive integer; and the terminal selects one third channel from the C third channels based on generated scheduling request information and acknowledgement information, and sends the selected third channel.

For example, a quantity of bits of acknowledgement information is 2, and a quantity of bits of scheduling request information is 1. In this case, if the terminal needs to simultaneously send the acknowledgement information and scheduling request information, it means that information sent by the terminal may correspond to states indicated by three bits. The three bits correspond to eight states. However, if the terminal does not need to simultaneously send the acknowledgement information and scheduling request information, the network device configures no first channel for the terminal, and information sent by the terminal may correspond to states indicated by only two bits. The two bits correspond to only four states. In a manner of sequence selection, each state of the information sent by the terminal corresponds to one channel. In this case, when the terminal needs to transmit the scheduling request information, the network device configures more channels for the terminal than those configured when the terminal does not need to transmit the scheduling request information, that is, N is greater than C. When the terminal does not need to transmit a scheduling request, the network device configures the C third channels for the terminal. In this case, when the terminal needs to transmit a scheduling request, it may be implemented as follows: The network device may additionally configure N-F channels for the terminal based on the C third channels. In other words, the N second channels include the C third channels and include the N-F second channels. Therefore, it can be considered that the C third channels are reused. In this manner, the C third channels can be reused for another terminal according to an original rule to the greatest extent without additionally configuring excessive new second channels. This better helps improve compatibility of the solution, and also helps improve resource utilization.

In a possible design, a first part of channels of a plurality of channels included in the proper subset of the N second channels are used to indicate that a scheduling request exists, and a second part of channels of the plurality of channels included in the proper subset of the N second channels are used to indicate that no scheduling request exists.

For example, values of a dedicated cyclic shift $n_s$ of candidate sequences corresponding to the C third channels are 0, 3, 6, and 9. After the candidate sequences corresponding to the cyclic shifts "0", "3", "6", and "9" go through a fading channel, inter-sequence interference is relatively small. If all the four candidate sequences are allocated to one type of scheduling request information, an interval between a cyclic shift corresponding to a case in which a scheduling request exists and a cyclic shift corresponding to a case in which no scheduling request exists may be relatively small.

For example, the cyclic shifts "0", "3", "6", and "9" are allocated to states (A, A, no scheduling request exists), (A, N, no scheduling request exists), (N, A, no scheduling request exists), and (N, N, no scheduling request exists) of acknowledgement information and scheduling request information respectively, and cyclic shifts "1", "4", and "7" are allocated to states (A, A, a scheduling request exists), (A, N, a scheduling request exists), and (N, A, a scheduling request exists) of acknowledgement information and scheduling request information respectively. Candidate sequences corresponding to the cyclic shifts "1", "4", and "7" cause relatively strong interference to candidate sequences corresponding to the cyclic shifts "0", "3", and "6", thereby degrading performance of detecting scheduling request information. However, if the cyclic shifts "0", "3". "6", and "9" are allocated to different scheduling request information, performance of detecting scheduling request information can be improved to some extent.

In a possible design, the second channel or the first channel in a subcarrier group is a channel generated based on a candidate sequence that is generated according to the following formula:

$$y_{s,i}=e^{(a_0+n_s)\cdot 2\pi\cdot j\cdot i/R}\cdot x_i, i=0,1,2,\ldots,R-1$$

where R is a length of the candidate sequence, R is a positive integer, $\{x_i|i=0, 1, \ldots, R-1\}$ is a sequence, $a_0+n_s$ is a cyclic shift of the candidate sequence $y_{s,i}$, $a_0$ an is an initial cyclic shift, $a_0$ is a real number, $n_s$ is a dedicated cyclic shift, $n_s$ is a real number, s is an indicator for indicating a sequence, and j is an imaginary unit.

A manner of generating a channel based on a candidate sequence is described. A manner of generating a channel is not limited to this manner in the embodiments of this application.

In a possible design, the network device may further determine a first mapping relationship of P mapping relationships, where each of the P mapping relationships includes a mapping relationship between N+M pieces of candidate information and N+M candidate sequences, the P mapping relationships further include a second mapping relationship, and values of $n_s$ that is in the first mapping relationship and the second mapping relationship and that is used to generate candidate sequences corresponding to same candidate information are different mod R, where mod indicates a modulo operation. Correspondingly, the terminal may also determine a first mapping relationship of P mapping relationships, where each of the P mapping relationships includes a mapping relationship between N+M pieces of candidate information and N+M candidate sequences, the P mapping relationships further include a second mapping relationship, and values of $n_s$ that is in the first mapping relationship and the second mapping relationship and that is used to generate candidate sequences corresponding to same candidate information are different mod R, where mod indicates a modulo operation.

Each of the P mapping relationships includes the mapping relationship between the N+M pieces of candidate information and the N+M candidate sequences. The N+M candidate sequences are generated based on $a_0$ and N+M values of $n_s$, that is, N candidate sequences of the N+M candidate sequences are generated based on $a_0$ and N values of $n_s$, and M candidate sequences of the N+M candidate sequences are generated based on $a_0$ and M values of $n_s$. It should be noted that values of $a_0$ may be different for different terminals, and values of $a_0$ may also be different when a same terminal sends sequences at different times. Therefore, for different terminals, because values of $a_0$ are different or frequency resources occupied by sequences are different, N+M candidate sequences corresponding to different terminals are also different. Likewise, when a same terminal sends candidate sequences at different times, because values of $a_0$ are different, N+M candidate sequences corresponding to different times are also different. In addition, states of acknowledgement information and scheduling request information corresponding to $a_0$ may be different for different terminals. In this manner, random processing can be implemented to the greatest extent, to reduce interference between different terminals in a same cell. For each terminal, the P mapping relationships are the same. However, a mapping relationship applicable to a terminal at one moment is determined based on an ID of the terminal or other information of the terminal. Therefore, mapping relationships used by different terminals at different moments vary, thereby reducing interference between different terminals in a same cell or randomizing interference.

In a possible design, the length of the candidate sequence is R, the N second channels include F second channels, values of $n_s$ of candidate sequences corresponding to the F second channels are 0, R/F, ..., and (F−1)R/F, a first part of channels of the F second channels are used to indicate that a scheduling request exists, and a second part of channels of the F second channels are used to indicate that no scheduling request exists.

In a possible design, when R=12, the F second channels are corresponding channels when values of $n_s$ are 0, 3, 6, and 9, where the value "0" of $n_s$ and the value "6" of $n_s$ correspond to same scheduling request information, or the value "0" of $n_s$ and the value "3" of $n_s$ correspond to same scheduling request information, or the value "0" of $n_s$ and the value "9" of $n_s$ correspond to same scheduling request information.

The F channels may be channels reused in two cases in which the network device configures no first channel for the terminal and in which the network device has configured the first channel for the terminal. In other words, the network device indicates the second channel to the terminal in both the cases in which the network device configures no first channel for the terminal and in which the network device has configured the first channel for the terminal. That is, the F second channels are reused. In this manner, the F second channels can be reused for another terminal according to an original rule to the greatest extent without additionally indicating excessive new second channels. This better helps improve compatibility of the solution, and also helps improve resource utilization.

For example, cyclic shifts corresponding to the F channels may be 0, 3, 6, and 9. After candidate sequences corresponding to the cyclic shifts "0", "3", "6", and "9" go through a fading channel, inter-sequence interference is relatively small. If all the four candidate sequences are allocated to one type of scheduling request information, an interval between a cyclic shift corresponding to a case in which a scheduling request exists and a cyclic shift corresponding to a case in which no scheduling request exists may be relatively small. For example, the cyclic shifts "0", "3", "6", and "9" are allocated to states (A, A, no scheduling request exists), (A, N, no scheduling request exists), (N, A, no scheduling request exists), and (N, N, no scheduling request exists) of acknowledgement information and scheduling request information respectively, and cyclic shifts "1", "4", and "7" are allocated to states (A, A, a scheduling request exists), (A, N, a scheduling request exists), and (N, A, a scheduling request exists) of acknowledgement information and scheduling request information respectively. Candidate sequences corresponding to the cyclic shifts "1", "4", and "7" cause relatively strong interference to candidate sequences corresponding to the cyclic shifts "0", "3", and "6", thereby degrading performance of detecting scheduling request information. However, if the cyclic shifts "0", "3", "6", and "9" are allocated to different scheduling request information, performance of detecting scheduling request information can be improved to some extent.

In a possible design, a state of the first acknowledgement information and the first scheduling request information is (N, a scheduling request exists) or (no downlink data scheduling is received, a scheduling request exists), and a state of the second scheduling request information and the second acknowledgement information is (A, a scheduling request exists), or (A, no scheduling request exists), or (N, no scheduling request exists); or a state of the first acknowledgement information and the first scheduling request information is (no downlink data scheduling is received, a scheduling request exists), and a state of the second scheduling request information and the second acknowledgement information is (A, a scheduling request exists), or (A, no scheduling request exists), or (N, no scheduling request exists), or (N, a scheduling request exists); or a state of the first acknowledgement information and the first scheduling request information is (N, N, a scheduling request exists) or (no downlink data scheduling is received, a scheduling request exists), and a state of the second scheduling request information and the second acknowledgement information is (A, A, a scheduling request exists), or (A, A, no scheduling request exists), or (A, N, a scheduling request exists), or (A, N, no scheduling request exists), or (N, A, a scheduling request exists), or (N, A, no scheduling request exists), or (N, N, no scheduling request exists); or a state of the first acknowledgement information and the first scheduling request information is (no downlink data scheduling is received, a scheduling request exists), and a state of the second scheduling request information and the second acknowledgement information is (A, A, a scheduling request exists), or (A, A, no scheduling request exists), or (A, N, a scheduling request exists), or (A, N, no scheduling request exists), or (N, A, a scheduling request exists), or (N, A, no scheduling request exists), or (N, N, no scheduling request exists), or (N, N, a scheduling request exists), where N indicates a NACK, and A indicates an ACK.

If the first acknowledgement information and the second acknowledgement information are acknowledgement information for one data block group, the network device may allocate one first channel and three second channels to the terminal, or allocate one first channel and four second channels to the terminal. If the first acknowledgement information and the second acknowledgement information are acknowledgement information for two data block groups, the network device may allocate one first channel and seven second channels to the terminal, or allocate one first channel and eight second channels to the terminal. That is, the network device configures a relatively small quantity of first channels for the terminal, and resource waste is also generally reduced. This can save resources to a relatively large extent, and implement relatively proper resource utilization.

According to a third aspect, a network device is provided, configured to perform the method according to any one of the first aspect or the possible designs of the first aspect. Specifically, the network device includes units configured to perform the method according to any one of the first aspect or the possible designs of the first aspect.

According to a fourth aspect, a terminal device is provided, configured to perform the method according to any one of the second aspect or the possible designs of the second aspect. Specifically, the terminal device includes units configured to perform the method according to any one of the second aspect or the possible designs of the second aspect.

According to a fifth aspect, a network device is provided. The network device has functions of the network device in the foregoing method designs. These functions may be implemented by hardware, or may be implemented by hardware executing corresponding software. The hardware or software includes one or more units corresponding to the foregoing functions.

In a possible design, a specific structure of the network device may include a transceiver and a processor. The transceiver and the processor may perform corresponding functions in the method according to any one of the first aspect or the possible designs of the first aspect.

According to a sixth aspect, a terminal device is provided. The terminal device has functions of the terminal device in the foregoing method designs. These functions may be implemented by hardware, or may be implemented by hardware executing corresponding software. The hardware or software includes one or more units corresponding to the foregoing functions.

In a possible design, a specific structure of the terminal device may include a transceiver and a processor. The transceiver and the processor may perform corresponding functions in the method according to any one of the second aspect or the possible designs of the second aspect.

According to a seventh aspect, a communications apparatus is provided. The apparatus may be the terminal apparatus in the foregoing method designs, or a chip disposed in the terminal apparatus in the foregoing method designs. The apparatus has functions of the terminal apparatus in the foregoing method designs. In a possible design, a specific structure of the apparatus may include a processor. The processor may perform corresponding functions in the method according to any one of the second aspect or the possible designs of the second aspect.

According to an eighth aspect, a computer storage medium is provided. The computer readable storage medium stores instructions. When the instructions are run on a computer, the computer is enabled to perform the method according to any one of the first aspect or the possible designs of the first aspect.

According to a ninth aspect, a computer storage medium is provided. The computer readable storage medium stores instructions. When the instructions are run on a computer, the computer is enabled to perform the method according to any one of the second aspect or the possible designs of the second aspect.

According to a tenth aspect, a computer program product including instructions is provided. The computer program product stores the instructions. When the instructions are run on a computer, the computer is enabled to perform the method according to any one of the first aspect or the possible designs of the first aspect.

According to an eleventh aspect, a computer program product including instructions is provided. The computer program product stores the instructions. When the instructions are run on a computer, the computer is enabled to perform the method according to any one of the second aspect or the possible designs of the second aspect.

In the embodiments of this application, the second channel is configured by the network device by using the downlink control channel, that is, the first channel can be dynamically scheduled. Therefore, according to the solutions provided in the embodiments of this application, when a relatively small quantity of terminals need to simultaneously transmit an ACK/a NACK and an SR, the second channel may be scheduled for another purpose, and a relatively small quantity of first channels are configured, that is, reserved SR resources are reduced, and resource waste is also generally reduced. This can save resources to a relatively large extent, and implement relatively proper resource utilization.

DESCRIPTION OF EMBODIMENTS

Figure 1:
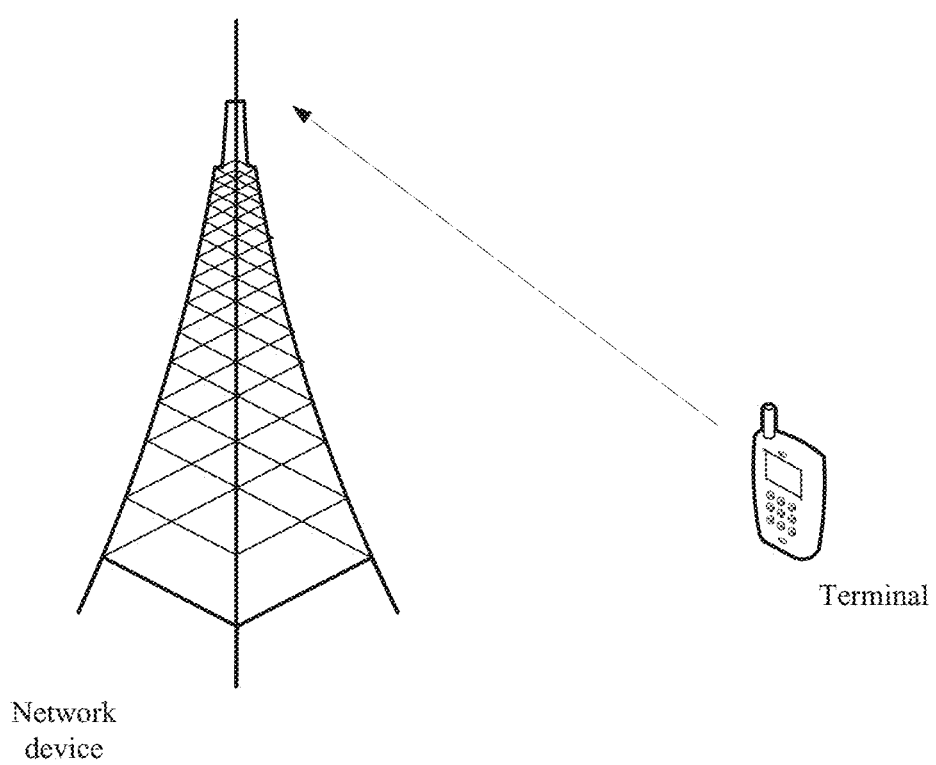
FIG. 1 is a schematic diagram of an application scenario according to an embodiment of this application.

To make the objectives, technical solutions, and advantages of the embodiments of this application clearer, the following further describes the embodiments of this application in detail with reference to the accompanying drawings.

In the following, some terms in the embodiments of this application are described, to help persons skilled in the art have a better understanding.

(1) A terminal may also be referred to as a terminal device, and may be a device that provides a user with voice and/or data connectivity, for example, may be a handheld device with a wireless connection function or a processing device connected to a wireless modem. The terminal may communicate with a core network through a radio access network (RAN), and exchange voice and/or data with the RAN. The terminal may be user equipment (UE), a wireless terminal, a mobile terminal, a subscriber unit, a subscriber station, a mobile station, a remote station, an access point (AP), a remote terminal, an access terminal, a user terminal, a user agent, a user device, or the like. For example, the terminal may be a mobile phone (or referred to as a "cellular" phone), a computer with a mobile terminal, a portable, pocket-sized, handheld, computer built-in, or in-vehicle mobile apparatus, or an intelligent wearable device. For example, the terminal may be a device such as a personal communication service (PCS) phone, a cordless phone, a session initiation protocol (SIP) phone, a wireless local loop (WLL) station, a personal digital assistant (PDA), a smartwatch, a smart helmet, smart glasses, or a smart band. Alternatively, the terminal may be a limited device, for example, a device with relatively low power consumption, a device with a limited storage capability, or a device with a limited computing capability. For example, the terminal may be an information sensing device such as a barcode scanner, radio frequency identification (RFID) device, a sensor, a global positioning system (GPS) device, or a laser scanner.

(2) A network device may be, for example, a base station (for example, an access point), and may be a device that is in an access network and that communicates with a wireless terminal over an air interface by using one or more cells. The base station may be configured to mutually convert a received over-the-air frame and an internet protocol (IP) packet and serve as a router between the terminal and the rest of the access network, where the rest of the access network may include an IP network. The base station may further coordinate attribute management of the air interface. For example, the base station may be an evolved NodeB (NodeB or eNB or e-NodeB, evolutional NodeB) in an LTE system or an LTE-advanced (LTE-A) system, or may be a next generation NodeB (next generation nodeB, gNB) in a 5G NR system. This is not limited in the embodiments of this application.

(3) A scheduling request is, for example, an SR, or may have another name. The SR is used by a terminal to request to transmit uplink data to a network device. After receiving the SR sent by the terminal, the network device configures, for the terminal by using uplink scheduling signaling (UL grant), a resource used to transmit the uplink data.

(4) The terms "system" and "network" may be used interchangeably in the embodiments of this application. "A Plurality of" means two or more. In view of this, "a plurality of" may also be understood as "at least two" in the embodiments of this application. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects, unless specially indicated.

Unless otherwise indicated, ordinal numbers, such as "first" and "second", mentioned in the embodiments of this application are used to distinguish between a plurality of objects, but are not intended to limit a sequence, a time sequence, a priority, or a degree of importance of the plurality of objects.

The technical solutions provided in this specification may be applied to a 5G NR system (referred to as an NR system below), a next generation mobile communications system, or another similar communications system.

The foregoing describes some concepts in the embodiments of this application. The following describes a technical background of the embodiments of this application.

An LTE system supports sending of a physical uplink control channel (PUCCH). The PUCCH usually occupies 13 or 14 orthogonal frequency division multiplexing (OFDM)/discrete Fourier transform-spread-orthogonal frequency division multiplexing (discrete Fourier transform-spread-OFDM, DFT-S-OFDM) symbols in one subframe for sending uplink control information (UCI). A PUCCH format1a/1b is used to transmit a one-bit or two-bit ACK/NACK. To improve coverage performance of the PUCCH format 1a/1b, sending is performed for the PUCCH format 1a/1b through sequence modulation. To be specific, on all OFDM symbols used to transmit uplink control information (UCI), a to-be-sent signal is modulated onto a computer generated sequence (CGS) for sending. In addition, a PUCCH format 1 is used by a terminal to report a scheduling request (SR) to a base station. A structure that is the same as that used for the PUCCH format 1a/1b is used to transmit information in the PUCCH format 1, and information does not need to be modulated onto CGS carried on all OFDM symbols.

In addition, in the LTE system, a terminal may need to simultaneously send an ACK/a NACK and an SR. In this case, to maintain a low peak to average power ratio (PAPR), the SR is carried in a manner of channel selection in the LTE system. To be specific, if the terminal sends an ACK/a NACK on an SR channel, it indicates that the terminal sends an SR at the same time. If the terminal sends an ACK/a NACK on an ACK channel/a NACK channel, it indicates that the terminal sends no SR. A base station determines, depending on whether the terminal sends information on an SR channel configured for the terminal, whether the terminal requests to schedule data.

An NR system already supports transmission for a short PUCCH. The short PUCCH occupies one or two OFDM/DFT-S-OFDM symbols for sending information. When the short PUCCH carries one-bit information or two-bit information, the information is transmitted on the short PUCCH in a manner of sequence selection. Specifically, for one-bit information, a gNB allocates, to a terminal, sequences corresponding to two cyclic shifts of one computer generated sequence (CGS). The two sequences are in a one-to-one correspondence with two states of the information that needs to be transmitted, that is, correspond to two states "0" and "1" respectively. For two-bit information, a gNB allocates, to a terminal, sequences corresponding to four cyclic shifts of one CGS. The four sequences are in a one-to-one correspondence with four states of the information that needs to be transmitted, that is, correspond to four states "00", "01", "10", and "11" respectively. Each sequence corresponds to one PUCCH. To be specific, in the NR system, for a short PUCCH carrying one-bit information, two PUCCHs need to be allocated, and for a two-bit short PUCCH 修改为 a short PUCCH carrying two-bit information, four PUCCHs need to be allocated.

In the NR system, there is also a case in which a terminal needs to simultaneously send an ACK/a NACK and an SR, and an ACK/a NACK and an SR may also need to be simultaneously sent on a short PUCCH. Therefore, when an ACK/a NACK and an SR carried on a short PUCCH of a terminal need to be simultaneously sent, the solution in the LTE system may be used. For example, when two-bit information is to be transmitted, when allocating an ACK/a NACK resource and an SR resource, the gNB allocates four orthogonal sequences (sequences corresponding to four cyclic shifts of one CGS), that is, four PUCCHs, for transmission of the ACK/a NACK; and also allocates a same quantity of sequences, that is, a same quantity of PUCCHs, for transmission of the SR. It can be learned that in the LTE system, an SR resource reserved for each terminal is one PUCCH; and in the NR system, for a short PUCCH, for example, a two-bit PUCCH, if the solution in the LTE system is used, an SR resource that needs to be reserved for each terminal is four PUCCHs. In this manner of reserving a large quantity of SR resources, when a relatively small quantity of terminals need to simultaneously transmit an ACK/a NACK and an SR, resources are wasted to some extent.

In view of this, the technical solutions in the embodiments of this application are provided, so that resource waste can be reduced.

The following describes an application scenario in the embodiments of this application. FIG. 1 is a schematic diagram of the application scenario. FIG. 1 includes a network device and a terminal. The network device may configure an SR resource and an ACK/a NACK resource for the terminal, so that the terminal may send an SR and/or an ACK a NACK to the network device by using an allocated resource. For example, the network device in FIG. 1 is an access network (AN) device, for example, a base station. The solutions in the embodiments of this application mainly relate to an access network device and a terminal. Therefore, no core network device is drawn in FIG. 1. For example, the access network device is a gNB in an NR system.

The following describes the technical solutions provided in the embodiments of this application with reference to the accompanying drawings.

Figure 2:
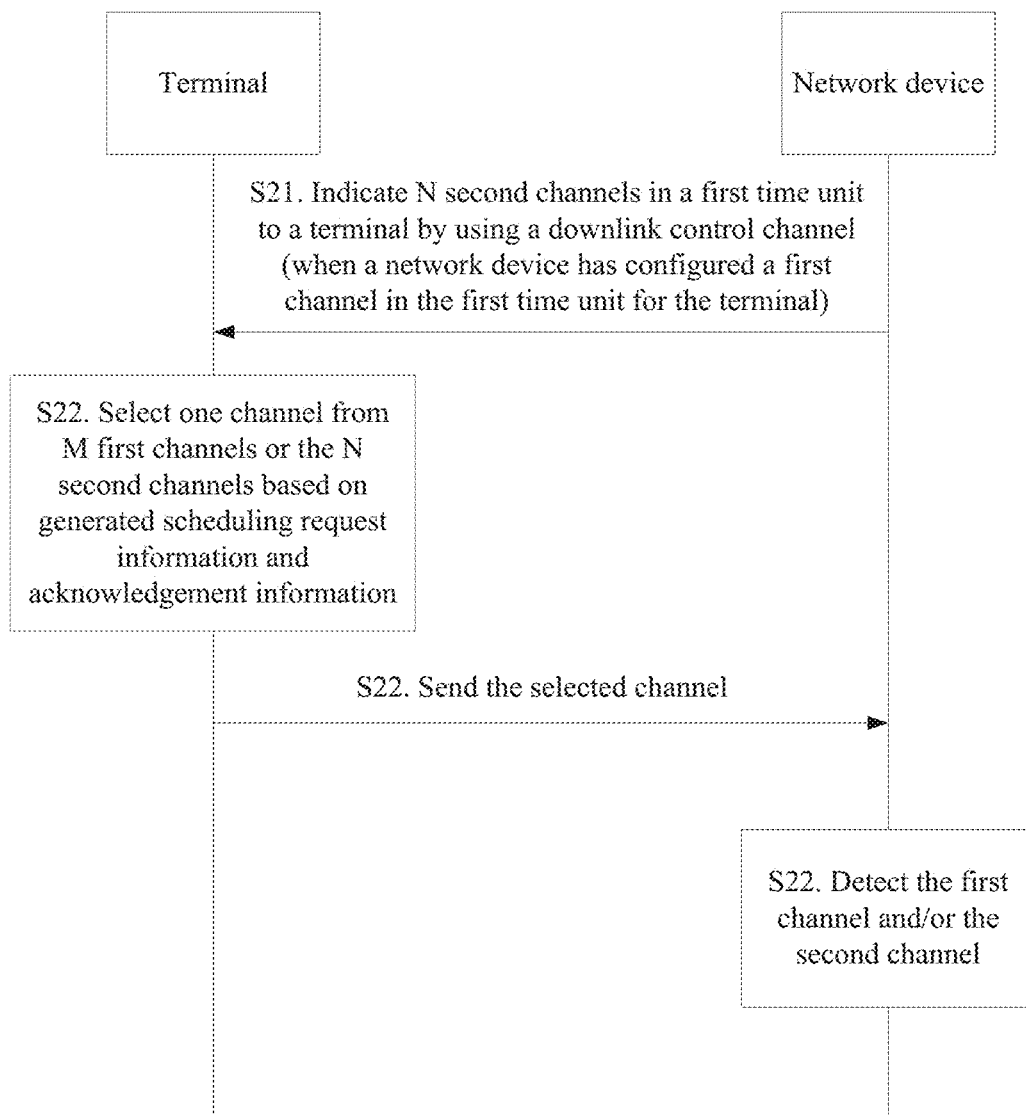
FIG. 2 is a flowchart of a communication method according to an embodiment of this application.

FIG. 2 shows a communication method provided in an embodiment of this application. In the following description process, an example in which the method is applied to the application scenario shown in FIG. 1 is used. A procedure of the method is described as follows.

S21. When a network device has configured a first channel in a first time unit for a terminal, the network device indicates N second channels in the first time unit to the terminal by using a downlink control channel, and the terminal determines, by using the downlink control channel, the N second channels in the first time unit that are indicated by the network device to the terminal, where a quantity of first channels in the first time unit that are configured by the network device for the terminal is M, and M is a positive integer.

The process of configuring, by the network device, the first channel in the first time unit for the terminal and the process of indicating the N second channels in the first time unit to the terminal may be performed simultaneously; or the network device may first configure the first channel for the terminal and then indicate the N second channels to the terminal; or the network device may first indicate the N second channels to the terminal and then configure the first channel for the terminal. In short, this step may be understood as a solution in a case in which the network device has configured the first channel in the first time unit for the terminal, but does not necessarily constitute a limitation that the first channel is configured before the second channel is indicated.

For example, the downlink control channel is a physical downlink control channel (physical downlink control channel, PDCCH), that is, the second channel is dynamically indicated by the network device by using the downlink control channel. The second channel is not bound to the terminal. This can be understood as follows: When the network device schedules a terminal to transmit information by using the second channel, the network device indicates the N second channels to the terminal; and when the network device does not need to schedule the terminal to transmit information by using the second channel, the N second channels may be indicated by the network device to another terminal for use. The second channel may be understood as a channel corresponding to acknowledgement information, for example, an ACK/a NACK channel; or the second channel may be understood as a resource carrying an ACK/a NACK.

Figure 3:
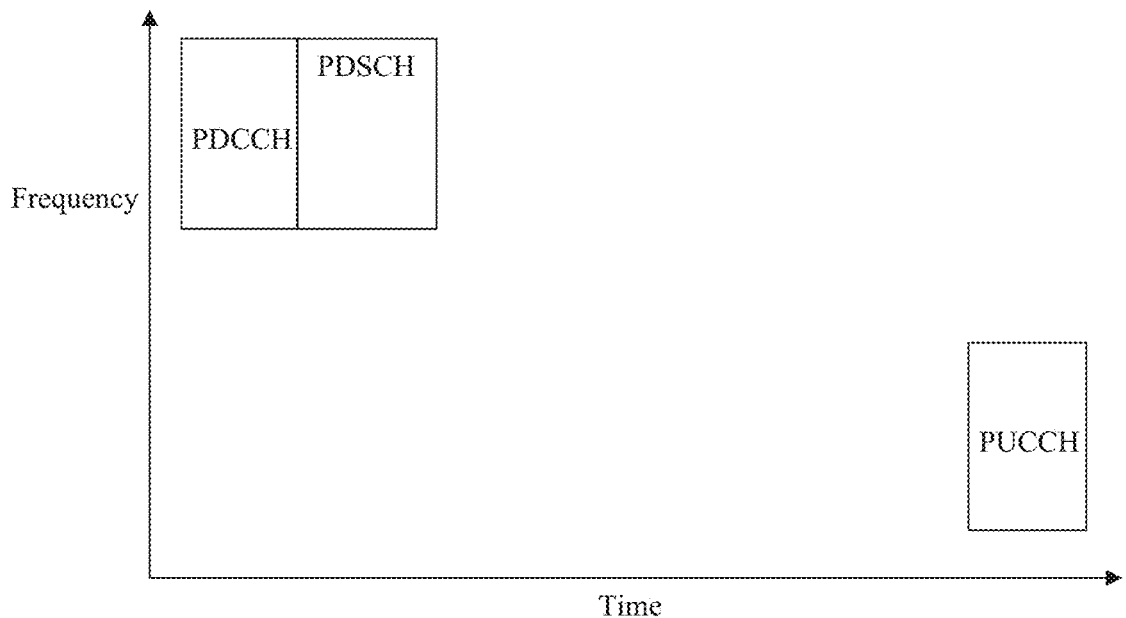
FIG. 3 is a schematic diagram of sending, by a network device, a PDCCH and receiving, by a terminal device, a PDSCH based on the PDCCH according to an embodiment of this application.

The following describes, with reference to FIG. 3, a source of acknowledgement information and how to send acknowledgement information. As shown in FIG. 3, the network device sends a PDCCH. The PDCCH may indicate a physical downlink shared channel (physical downlink shared channel, PDSCH) in a same slot. The terminal receives the PDCCH; may receive the PDSCH based on indication information of the PDCCH; and determines, depending on a receiving state of data carried on the PDSCH, for example, whether cyclic redundancy check (cyclic redundancy check, CRC) succeeds or fails, whether the data is correctly or incorrectly received, to correspondingly generate an ACK or a NACK. The terminal sends acknowledgement information or acknowledgement information and scheduling request information on the PUCCH based on the indication information of the PDCCH. The PUCCH may be the aforementioned first channel or second channel or a third channel that is described in the following.

The second channel is used to send second acknowledgement information and second scheduling request information in the first time unit. M+N is greater than or equal to 2×B, and M is less than N. The second acknowledgement information is an element in a second acknowledgement information set. B is a quantity of elements in the second acknowledgement information set. The second scheduling request information indicates that a scheduling request exists or no scheduling request exists. For example, when B=2, M may be 1, and N may be 3 or 4; or when B=4, M may be 1, and N may be 7 or 8.

The second acknowledgement information set includes acknowledgement information indicating a data receiving state. For example, the second acknowledgement information is acknowledgement information indicating a receiving state of one data block group. In this case, a quantity of bits of the second acknowledgement information is 1, and the second acknowledgement information set is {N, A}. The data block group may include one or more data blocks. Alternatively, the second acknowledgement information is acknowledgement information indicating a receiving state of two data block groups. In this case, a quantity of bits of the second acknowledgement information is 2, and the second acknowledgement information set is {(N, N), (N, A), (A, N), (A, A)}. Each of the two data block groups may include one or more data blocks. In the acknowledgement information set, N indicates a NACK, and A indicates an ACK.

Any one of the M first channels is different from any one of the N second channels. In other words, any two channels of M+N channels are different channels. Herein, that channels are different may be understood as that candidate sequences used to generate the channels are different, or time-frequency resources occupied by the channels are different. A concept of a candidate sequence is described in the following.

In addition, there is a time-domain overlapping part between a time-frequency resource of the second channel and a time-frequency resource of the first channel in the first time unit. For example, the time-frequency resource of the second channel and the time-frequency resource of the first channel completely overlap in the first time unit in time domain, or the time-frequency resource of the second channel and the time-frequency resource of the first channel partially overlap in the first time unit in time domain. That is, the network device configures the first channel for the terminal and indicates the second channel to the terminal, and there is an overlapping part between the second channel and the first channel in time domain. In this case, if the terminal sends acknowledgement information by using the second channel and sends scheduling request information by using the first channel, a low PAPR may not be ensured. To ensure a PAPR that is as low as possible, the terminal may select one of the channels for sending. This embodiment of this application provides a technical solution on this basis.

The first channel is used to indicate first scheduling request information in the first time unit, or the first channel is used to indicate the first scheduling request information and send first acknowledgement information in the first time unit. The first scheduling request information indicates that a scheduling request exists or no scheduling request exists. The first acknowledgement information is an element in a first acknowledgement information set. The first acknowledgement information set includes acknowledgement information indicating a data receiving state. For example, the first acknowledgement information is acknowledgement information indicating a receiving state of one data block group. In this case, a quantity of bits of the first acknowledgement information is 1, and the first acknowledgement information set is (N). The data block group may include one or more data blocks. Alternatively, the first acknowledgement information is acknowledgement information indicating a receiving state of two data block groups. In this case, a quantity of bits of the first acknowledgement information is 2, and the first acknowledgement information set is {(N, N)}. Each of the two data block groups may include one or more data blocks.

The first channel is configured by the network device for the terminal. The first channel may be understood as a channel corresponding to a scheduling request, for example, an SR channel; or the first channel may be understood as a resource carrying an SR. After the first channel is configured for a terminal, the first channel usually cannot be scheduled to another terminal for use. That the first channel indicates the first scheduling request information may be understood as follows: If the terminal sends a scheduling request by using the first channel, in other words, the first channel carries the scheduling request, the first scheduling request information indicated by the first channel indicates that a scheduling request exists; or if the terminal sends no scheduling request by using the first channel, in other words, the first channel carries no scheduling request, the first scheduling request information indicated by the first channel indicates that no scheduling request exists. That is, a reason why the first channel indicating the first scheduling request information is described is that the first channel indicates, depending on whether a scheduling request is sent or not, whether a scheduling request exists.

At a moment, if the terminal does not need to simultaneously send an SR and an ACK/a NACK, and the terminal does not need to send an ACK/a NACK, a channel occupied by the terminal is only an SR channel configured by the network device for the terminal, and an ACK/a NACK channel may be scheduled by the network device to another terminal for use without being indicated to the terminal. In this embodiment of this application, SR channels configured by the network device for the terminal are fewer than ACK/NACK channels indicated to the terminal, that is, fewer SR resources are configured for the terminal. Therefore, when the terminal does not need to simultaneously send an SR and an ACK a NACK, reserved resources can be saved, and resource waste is reduced. Especially, when a large quantity of terminals do not need to simultaneously transmit an ACK/a NACK and an SR, an advantage of the technical solution in this embodiment of this application is more obvious, and an effect of saving resources is more significant.

For the network device, a total quantity of configured first channels is M×K. K is a quantity, supported by the network device, of terminals that can simultaneously transmit scheduling requests. A total quantity of second channels in the first time unit that are indicated by the network device is N×Q. Q is a quantity of terminals to which the network device indicates a second channel in the first time unit. A terminal, included in the Q terminals, to which a second channel in the first time unit is indicated is a terminal for which a first channel is configured, that is, a quantity of second channels depends on a quantity of terminals scheduled by the network device. Therefore, in the first time unit, resources indicated by the network device include M×K first channels and N×Q second channels. In this embodiment of this application, a value of M is relatively small. Therefore, if a quantity of terminals to which the network device indicates a second channel in the first time unit is also relatively small, a value of N×Q is also relatively small. For example, a quantity of bits of acknowledgement information is 2. In the first time unit, M=1; the quantity, supported by the network device, of terminals that can simultaneously transmit scheduling requests is 400, that is, K=400; N=7; and the quantity of terminals to which the network device indicates a second channel in the first time unit is 100, that is, Q=100. In this case, a resource, in the first time unit, indicated by the network device is 1×400+7×100=1100. However, if the solution in the LTE system is used, a quantity of SR channels configured by the network device for the terminal is equal to that of ACK/NACK channels configured by the network device for the terminal, and both the quantities are 4. In this case, a resource, in the first time unit, indicated by the network device is 4×400+4×100=2000. It can be learned that when the network device schedules a relatively small quantity of terminals, the technical solution in this embodiment of this application is relatively advantageous.

The network device may configure the M first channels for the terminal by using higher layer signaling. For example, the higher layer signaling is radio resource control (RRC) signaling. Alternatively, the network device may configure the M first channels for the terminal by using other signaling.

The foregoing describes the case in which the network device has configured the M first channels in the first time unit for the terminal. That is, if the network device has configured the M first channels in the first time unit for the terminal, the network device may indicate the N second channels in the first time unit to the terminal. However, if the network device configures no first channel in the first time unit for the terminal, for example, the network device determines that the terminal does not need to transmit scheduling request information in the first time unit, and therefore configures no first channel in the first time unit for the terminal, if the network device determines that the terminal is to transmit acknowledgement information in the first time unit, the network device may also indicate a third channel in the first time unit to the terminal. For example, the network device indicates C third channels to the terminal, where C is a positive integer. The C third channels are a proper subset of the N second channels. When the network device does not configure the M first channels for the terminal, the third channel is used to send third acknowledgement information in the first time unit. This can be understood as that the third channel is a channel carrying an ACK/a NACK channel. The third acknowledgement information is an element in a third acknowledgement information set. The third acknowledgement information set includes acknowledgement information indicating a data receiving state. For example, the third acknowledgement information is acknowledgement information indicating a receiving state of one data block group. In this case, a quantity of bits of the third acknowledgement information is 1, and the third acknowledgement information set is {N, A}. The data block group may include one or more data blocks. Alternatively, the third acknowledgement information is acknowledgement information indicating a receiving state of two data block groups. In this case, a quantity of bits of the third acknowledgement information is 2, and the third acknowledgement information set is {(N, N), (N, A), (A, N), (A, A)}. Each of the two data block groups may include one or more data blocks.

If the network device indicates the C third channels to the terminal, the terminal may select one third channel from the C third channels based on generated scheduling request information and acknowledgement information, and send the selected third channel. The network device can obtain, by detecting the third channel, the scheduling request information and the acknowledgement information that are sent by the terminal.

If the network device has configured the first channel in the first time unit for the terminal, it indicates that the terminal can transmit scheduling request information in the first time unit, and the terminal needs to simultaneously send acknowledgement information and scheduling request information. However, if the network device configures no first channel for the terminal, it indicates that the terminal needs to send only acknowledgement information but does not need to send scheduling request information. For example, a quantity of bits of acknowledgement information is 2, and a quantity of bits of scheduling request information is 1. In this case, if the terminal needs to simultaneously send the acknowledgement information and scheduling request information, it means that information sent by the terminal may correspond to states indicated by three bits. The three bits correspond to eight states. However, if the terminal does not need to simultaneously send the acknowledgement information and scheduling request information, the network device configures no first channel for the terminal, and information sent by the terminal may correspond to states indicated by only two bits. The two bits correspond to only four states. In a manner of sequence selection, each state of the information sent by the terminal corresponds to one channel. In this case, when the terminal needs to transmit the scheduling request information, the network device configures more channels for the terminal than those configured when the terminal does not need to transmit the scheduling request information, that is, N is greater than C. When the terminal does not need to transmit a scheduling request, the network device configures the C third channels for the terminal. In this case, when the terminal needs to transmit a scheduling request, it may be implemented as follows: The network device may additionally configure N-F channels for the terminal based on the C third channels. In other words, the N second channels include the C third channels and include the N-F second channels. Therefore, it can be considered that the C third channels are reused. In this manner, the C third channels can be reused for another terminal according to an original rule to the greatest extent without additionally configuring excessive new second channels. This better helps improve compatibility of the solution, and also helps improve resource utilization.

The foregoing describes the solution in which the C third channels can be reused. When the C third channels are reused, if the network device has configured the M first channels in the first time unit for the terminal, the reused C third channels in the N second channels indicate at least two types of scheduling request information. That is, a first part of channels of a plurality of channels included in the proper subset of the N second channels are used to indicate that a scheduling request exists, and a second part of channels of the plurality of channels included in the proper subset of the N second channels are used to indicate that no scheduling request exists. The proper subset of the N second channels is the C third channels.

For example, a quantity of bits of the second acknowledgement information is 2. If the network device schedules no first channel for the terminal, the quantity C of third channels indicated by the network device to the terminal is, for example, 4. The four third channels are a third channel A, a third channel B, a third channel C, and a third channel D. However, if the network device has scheduled the M first channels for the terminal, the quantity N of second channels indicated by the network device to the terminal is, for example, 7. The seven second channels are a second channel A, a second channel B, a second channel C, a second channel D, a second channel E, a second channel F, and a second channel G. The third channel A and the second channel A are a same channel. The third channel B and the second channel B are a same channel. The third channel C and the second channel C are a same channel. The third channel D and the second channel D are a same channel. It can be learned that the second channel A (namely, the third channel A), the second channel B (namely, the third channel B), the second channel C (namely, the third channel C), and the second channel D (namely, the third channel D) are reused. In this case, a first part of second channels of the second channel A, the second channel B, the second channel C, and the second channel D indicate that a scheduling request exists, and a second part of second channels of the second channel A, the second channel B, the second channel C, and the second channel D indicate that no scheduling request exists. For example, a state of second acknowledgement information and second scheduling request information sent through the second channel A is (A, A, a scheduling request exists), a state of second acknowledgement information and second scheduling request information sent through the second channel B is (A, A, no scheduling request exists), a state of second acknowledgement information and second scheduling request information sent through the second channel C is (A, N, a scheduling request exists), and a state of second acknowledgement information and second scheduling request information sent through the second channel D is (A, N, no scheduling request exists), that is, the second channel A and the second channel C indicate that a scheduling request exists, and the second channel B and the second channel D indicate that no scheduling request exists.

For example, values of $n_s$ of candidate sequences corresponding to the C third channels are 0, 3, 6, and 9. After candidate sequences corresponding to the cyclic shifts "0", "3", "6", and "9" go through a fading channel, inter-sequence interference is relatively small. If all the four candidate sequences are allocated to one type of scheduling request information, an interval between a cyclic shift corresponding to a case in which a scheduling request exists and a cyclic shift corresponding to a case in which no scheduling request exists may be relatively small. For example, the cyclic shifts "0", "3", "6", and "9" are allocated to states (A, A, no scheduling request exists), (A, N, no scheduling request exists), (N, A, no scheduling request exists), and (N, N, no scheduling request exists) of acknowledgement information and scheduling request information respectively, and cyclic shifts "1", "4", and "7" are allocated to states (A, A, a scheduling request exists), (A, N, a scheduling request exists), and (N, A, a scheduling request exists) of acknowledgement information and scheduling request information respectively. Candidate sequences corresponding to the cyclic shifts "1", "4", and "7" cause relatively strong interference to candidate sequences corresponding to the cyclic shifts "0", "3", and "6", thereby degrading performance of detecting scheduling request information. However, if the cyclic shifts "0", "3", "6", and "9" are allocated to different scheduling request information, performance of detecting scheduling request information can be improved to some extent. $n_s$ is described in the following.

In this embodiment of this application, the first channel or the second channel is a channel generated based on a candidate sequence, that is, the N second channels are in a one-to-one correspondence with N candidate sequences, and the M first channels are in a one-to-one correspondence with M candidate sequences. In addition, each candidate sequence corresponds to different candidate information. The candidate information may be understood as a state of acknowledgement information and scheduling request information. Therefore, a channel, a candidate sequence, and candidate information are in a one-to-one correspondence. In this case, sending by using different channels or sending different channels means sending different candidate information.

In an example, the candidate sequence may be generated based on the following sequence: a computer generated sequence (CGS), a constant amplitude zero auto correlation (CAZAC) sequence, a Zadoff-Chu sequence, or the like. For a first channel or a second channel in a same subcarrier group, each candidate sequence may be generated according to the following Formula 1:

$$y_{s,i} = e^{(a_0+n_s) \cdot 2\pi j \cdot i/R} x_i, i=0,1,2,\ldots,R-1 \qquad \text{(Formula 1)}$$

where R is a length of the candidate sequence; R is a positive integer; $\{x_i|i=0, 1, 2, \ldots, R-1\}$ is a sequence, for example, a predefined or system-allocated sequence, for example, a CGS sequence; $a_0+n_s$ is a cyclic shift (denoted as $n_i$ for ease of differentiation and understanding) of the candidate sequence $\{y_{s,i}\}$, that is, it may be considered that the sequence $\{y_{s,i}\}$ is obtained by performing a cyclic shift on $\{x_i|i=0, 1, 2, \ldots, R-1\}$; j is an imaginary unit: $a_0$ is an initial cyclic shift and is a real number; and $n_s$ is a dedicated cyclic shift and is a real number. For example, for N+M candidate sequences corresponding to one terminal, $a_0$ indicates an initial cyclic shift, and is a common parameter used to generate the N+M candidate sequences, that is, a value of $a_0$ used to generate each of the N+M candidate sequences is the same; or terminals in different cells may correspond to different values of $a_0$ at one moment, one terminal corresponds to one value of $a_0$ at one moment, and one terminal may also correspond to different values of $a_0$ at different moments. $n_s$ indicates a dedicated cyclic shift, and is a dedicated parameter used by the terminal to generate each of the N+M candidate sequences, that is, different candidate sequences of one terminal correspond to different values of $n_s$. s is an indicator for indicating a candidate sequence. For example, s may be 0, 1, 2, . . . , which correspond to candidate sequences $\{y_{0,i}|i=0, 1, 2, \ldots, R-1\}$, $\{y_{1,i}|i=0, 1, 2, \ldots, R-1\}$, $\{y_{2,i}|i=0, 1, 2, \ldots, R-1\}$, . . . respectively. For first channels in different subcarrier groups, $a_0$ and/or $n_s$ in Formula 1 may have independent values. For second channels in different subcarrier groups, $a_0$ and/or $n_s$ in Formula 1 may have independent values.

The candidate sequence in Formula 1 may be mapped to G consecutive subcarriers in frequency domain, or mapped to G uniformly spaced subcarriers in frequency domain. The G consecutive subcarriers or uniformly spaced subcarriers form one subcarrier group. A plurality of candidate sequences in Formula 1 may be mapped to different subcarrier groups. For candidate sequences mapped to different subcarrier groups, even if values of $n_s$ are the same, it is considered that different channels are generated. For example, when s=0 and s=5, values of $n_s$ may be the same, but $\{y_{s,i}|i=0, 1, 2, \ldots, R-1\}$ is mapped to different subcarrier groups and therefore corresponds to different channels. For a plurality of candidate sequences mapped to a same subcarrier group, values of $a_0$ may be the same. For two candidate sequences mapped to different subcarrier groups, values of $a_0$ may be the same or different. For example, a candidate sequence used to generate the first channel and a candidate sequence used to generate the second channel may occupy different subcarrier groups in one time period, or a candidate sequence used to generate the first channel and a candidate sequence used to generate the second channel may occupy a same subcarrier group in one time period.

Therefore, it can be learned from the foregoing formula that $n_i$ may be used to distinguish between different candidate information, in other words, $n_i$ may be used to distinguish between different candidate sequences. That is, for one terminal, values of $n_i$ of candidate sequences of one subcarrier group corresponding to different states of acknowledgement information and scheduling request information are different.

In this embodiment of this application, P mapping relationships are formed between candidate information and a candidate sequence. In this embodiment of this application, a quantity of mapping relationships is not limited, provided that P is greater than 1. Each of the P mapping relationships includes a mapping relationship between N+M pieces of candidate information and N+M candidate sequences. N pieces of candidate information of the N+M pieces of candidate information include an element in the second acknowledgement information set and the second scheduling request information. M pieces of candidate information of the N+M pieces of candidate information include an element in the first acknowledgement information set and the first scheduling request information. That is, a state of acknowledgement information and scheduling request information constitutes candidate information, the candidate information corresponds to a candidate sequence, and one candidate sequence is further used to generate one channel. The candidate sequence may be generated by performing a cyclic shift on a root sequence. For example, a maximum quantity of cyclic shifts that can be supported by one CGS sequence used as a root sequence is a quantity of elements in the CGS sequence. For example, a maximum quantity of cyclic shifts supported by one CGS sequence with a length of 12 is 12. In addition, 12 sequences generated based on 12 cyclic shifts of one CGS sequence are orthogonal to each other. In this case, a candidate sequence corresponding to acknowledgement information and scheduling request information may be a sequence obtained by performing a cyclic shift on the CGS sequence.

The N second channels indicated by the network device to a terminal may be generated by performing a cyclic shift on one root sequence, or may be generated by performing cyclic shifts on a plurality of root sequences. For example, for two-bit acknowledgement information, the network device indicates seven second channels to the terminal. The seven second channels may be channels generated based on candidate sequences that are generated by performing seven cyclic shifts on one root sequence. Each cyclic shift corresponds to one state of acknowledgement information and scheduling request information. For example, states, corresponding to the seven candidate sequences, of acknowledgement information and scheduling request information are (A, A, no scheduling request exists), (A, N, no scheduling request exists), (N, A, no scheduling request exists), (N, N, no scheduling request exists), (A, A, a scheduling request exists), (A, N, a scheduling request exists), and (N, A, a scheduling request exists). Alternatively, the seven second channels correspond to two root sequences. Sequences generated based on the two root sequences are mapped to different subcarrier groups. To be specific, four of the seven second channels are channels generated based on four candidate sequences that are generated by performing four cyclic shifts on one of the root sequences, and the remaining three of the seven second channels are channels generated based on three candidate sequences that are generated by performing three cyclic shifts on the other root sequence. One cyclic shift of each root sequence corresponds to one state of acknowledgement information and scheduling request information. For example, states, corresponding to the seven candidate sequences, of acknowledgement information and scheduling request information are (A, A, no scheduling request exists), (A, N, no scheduling request exists), (N, A, no scheduling request exists), (N, N, no scheduling request exists), (A, A, a scheduling request exists), (A, N, a scheduling request exists), and (N, A, a scheduling request exists).

The following describes the P mapping relationships by using an example. For example, P is 8, N is 7, and M is 1. To be specific, the eight mapping relationships include eight pieces of candidate information (denoted as candidate information #1 to candidate information #8) and eight candidate sequences (denoted as a candidate sequence #1 to a candidate sequence #8). Each of the eight mapping relationships indicates a mapping relationship between the eight pieces of candidate information and the eight candidate sequences. For example, in a first mapping relationship, the candidate information #1 corresponds to the candidate sequence #1, and the candidate information #2 corresponds to the candidate sequence #2. However, in a second mapping relationship, the candidate information #1 may correspond to the candidate sequence #2, and the candidate information #2 corresponds to the candidate sequence #1.

The following describes in detail the P mapping relationships in this embodiment of this application with reference to Table 1.

Table 1 schematically shows the P mapping relationships in this embodiment of this application. As shown in Table 1, P=4, that is, there are four mapping relationships: a mapping relationship #1, a mapping relationship #2, a mapping relationship #3, and a mapping relationship #4. There are four pieces of candidate information: candidate information #1, candidate information #2, candidate information #3, and candidate information #4. The four pieces of candidate information respectively indicate (A, N, a scheduling request exists), (N, N, no scheduling request exists), (A, A, a scheduling request exists), and (N, A, no scheduling request exists). There are four candidate sequences: a candidate sequence #1, a candidate sequence #2, a candidate sequence #3, and a candidate sequence #4, which respectively correspond to values "0", "6", "9", and "3" of $n_s$. A value in brackets after each candidate sequence is a value of $n_s$ corresponding to the candidate sequence. Each of the four mapping relationships indicates a mapping relationship between the four pieces of candidate information and the four candidate sequences. The four candidate sequences correspond to the four values of $n_s$, that is, each value of $n_s$ is used to generate a corresponding candidate sequence.

In this embodiment of this application, in at least two of the P mapping relationships, values of $n_s$ used to generate candidate sequences corresponding to same candidate information are different mod R. For example, the P mapping relationships include a first mapping relationship and a second mapping relationship, and values of $n_s$ that is in the first mapping relationship and the second mapping relationship and that is used to generate candidate sequences corresponding to same candidate information are different mod R, that is, the P mapping relationships include at least two different mapping relationships. mod indicates a modulo operation.

In this embodiment of this application, that values of $n_s$ in the first mapping relationship and the second mapping relationship used to generate candidate sequences corresponding to same candidate information are different mod R may be understood as that remainders obtained by separately performing modulo operations on R and $n_s$ in the two mapping relationships are different. For example, a remainder A is obtained by performing a modulo operation on R and the value of $n_s$ that is in the first mapping relationship and that is used to generate a candidate sequence corresponding to candidate information a, a remainder B is obtained by performing a modulo operation on R and the value of $n_s$ that is in the second mapping relationship and that is used to generate a candidate sequence corresponding to the candidate information a, and the remainder A and the remainder B are different.

The mapping relationship #1 and the mapping relationship #2 are used as examples. In the two mapping relationships, for the candidate information #1, values of $n_s$ in the two mapping relationships are different mod R; for the candidate information #2, values of $n_s$ in the two mapping relationships are also different mod R; for the candidate information #3, values of $n_s$ in the two mapping relationships are the same mod R; and for the candidate information #4, values of $n_s$ in the two mapping relationships are also the same mod R.

Likewise, the mapping relationship #2 and the mapping relationship #3 are used as examples. For any one of the four pieces of candidate information, values of $n_s$ in the two mapping relationships are different mod R.

TABLE 1

| Mapping relationship | Candidate information | | | |
|---|---|---|---|---|
| | Candidate information #1 | Candidate information #2 | Candidate information #3 | Candidate information #4 |
| Mapping relationship #1 | Candidate sequence #1 (0) | Candidate sequence #2 (6) | Candidate sequence #3 (3) | Candidate sequence #4 (9) |
| Mapping relationship #2 | Candidate sequence #2 (6) | Candidate sequence #1 (0) | Candidate sequence #3 (3) | Candidate sequence #4 (9) |
| Mapping relationship #3 | Candidate sequence #1 (0) | Candidate sequence #2 (6) | Candidate sequence #4 (9) | Candidate sequence #3 (3) |
| Mapping relationship #4 | Candidate sequence #2 (6) | Candidate sequence #1 (0) | Candidate sequence #4 (9) | Candidate sequence #3 (3) |

A terminal #A selects one mapping relationship from the four mapping relationships according to a rule configured by the network device or a stipulation of a protocol, and further determines a candidate sequence corresponding to generated information #A based on the selected mapping relationship, or determines a dedicated cyclic shift corresponding to the information #A based on the selected mapping relationship. The information #A is a state of acknowledgement information and scheduling request information.

As described above, each of the P mapping relationships includes the mapping relationship between the N+M pieces of candidate information and the N+M candidate sequences. The N+M candidate sequences are generated based on $a_0$ and N+M values of $n_s$, that is, N candidate sequences of the N+M candidate sequences are generated based on $a_0$ and N values of $n_s$, and M candidate sequences of the N+M candidate sequences are generated based on $a_0$ and M values of $n_s$.

It should be noted that values of $a_0$ may be different for different terminals, and values of $a_0$ may also be different when a same terminal sends sequences at different times. Therefore, for different terminals, because values of $a_0$ are different or frequency resources occupied by sequences are different, N+M candidate sequences corresponding to different terminals are also different. Likewise, when a same terminal sends candidate sequences at different times, because values of $a_0$ are different, N+M candidate sequences corresponding to different times are also different.

In addition, states of acknowledgement information and scheduling request information corresponding to $a_0$ may be different for different terminals. This may be understood as follows: This embodiment of this application provides the P mapping relationships. In this case, the terminal may determine, based on a first mapping relationship of the P mapping relationships, a candidate sequence corresponding to a state of acknowledgement information and scheduling request information that are generated by the terminal, that is, determine the second channel or the first channel, to send the determined channel. Likewise, the network device may also determine the first mapping relationship of the P mapping relationships in a manner that is the same as that used by the terminal, to receive the channel sent by the terminal. In this manner, random processing can be implemented to the greatest extent, to reduce interference between different terminals in a same cell. One of the P mapping relationships that is to be used for a terminal at a moment may be configured by the network device or stipulated by a protocol. This is not limited in this embodiment of this application. To be specific, for each terminal, the P mapping relationships are the same. However, a mapping relationship applicable to a terminal at one moment is determined based on an identity (ID) of the terminal or other information of the terminal. Therefore, mapping relationships used by different terminals at different moments vary, thereby reducing interference between different terminals in a same cell or randomizing interference.

For example, for a terminal, in a slot n, seven candidate sequences correspond to seven cyclic shifts of one root sequence. The seven cyclic shifts are 0, 3, 6, 9, 1, 4, and 7. The seven sequences are mapped to a subcarrier group 1. In this case, values of $a_0$ corresponding to the seven candidate sequences are 0, and values of $n_s$ are 0, 3, 6, 9, 1, 4, and 7. States, corresponding to the different values of $n_s$, of acknowledgement information and scheduling request information are (A, A, a scheduling request exists), (A, N, no scheduling request exists), (N, A, no scheduling request exists), (N, N, no scheduling request exists), (A, A, no scheduling request exists), (A, N, a scheduling request exists), and (N, A, a scheduling request exists). For another terminal, seven candidate sequences may be mapped to a subcarrier group 2. Still in the slot n, cyclic shifts used for the seven candidate sequences may be respectively 1, 4, 7, 10, 2, 5, and 6. In this case, values of $a_0$ corresponding to the seven candidate sequences are 1, and values of $n_s$ are 0, 3, 6, 9, 1, 4, and 7. The different values of $n_s$ respectively correspond to (A, A, no scheduling request exists), (A, N, a scheduling request exists), (N, A, no scheduling request exists), (N, N, no scheduling request exists), (A, A, a scheduling request exists), (A, N, no scheduling request exists), and (N, A, a scheduling request exists).

In this embodiment of this application, the N second channels may include F second channels, values of $n_s$ of candidate sequences corresponding to the F second channels are 0, R/F, . . . , and (F−1)R/F, a first part of channels of the F second channels are used to indicate that a scheduling request exists, and a second part of channels of the F second channels are used to indicate that no scheduling request exists. The following provides detailed description.

As described above, if the network device configures no first channel for the terminal, the network device may indicate the C third channels to the terminal. The C third channels and the F second channels may be same channels, that is, the C third channels may also be referred to as the F second channels, and C=F. This may be understood as follows: The N second channels include the F second channels. The F channels may be channels reused in two cases in which the network device configures no first channel for the terminal and in which the network device has configured the first channel for the terminal. In other words, the network device indicates the second channel to the terminal in both the cases in which the network device configures no first channel for the terminal and in which the network device has configured the first channel for the terminal. When the network device configures no first channel for the terminal, the F second channels are used to send third acknowledgement information in the first time unit. The third acknowledgement information is an element in a third acknowledgement information set. For this part of content, refer to the foregoing descriptions about the C third channels.

It can be learned from the foregoing descriptions that the F second channels are reused. In this manner, the F second channels can be reused for another terminal according to an original rule to the greatest extent without additionally indicating excessive new second channels. This better helps improve compatibility of the solution, and also helps improve resource utilization.

The foregoing describes the solution in which the F second channels can be reused. When the F second channels are reused, if the network device has configured the M first channels in the first time unit for the terminal, a first part of second channels of the F second channels are used to indicate that a scheduling request exists, and a second part of second channels of the F second channels are used to indicate that no scheduling request exists. For example, a quantity of bits of the second acknowledgement information is 2. If the network device configures no first channel for the terminal, the quantity F of second channels indicated by the network device to the terminal is, for example, 4. The four second channels are a second channel A, a second channel B, a second channel C, and a second channel D. However, if the network device has configured the M first channels for the terminal, the quantity N of second channels indicated by the network device to the terminal is, for example, 7. The seven second channels are a second channel A, a second channel B, a second channel C, a second channel D, a second channel E, a second channel F, and a second channel G. It can be learned that the second channel A, the second channel B, the second channel C, and the second channel D are reused. In this case, the second channel A, the second channel B, the second channel C, and the second channel D indicate at least two types of scheduling request information, that is, some of the second channel A, the second channel B, the second channel C, and the second channel D indicate that a scheduling request exists, and the rest of the second channel A, the second channel B, the second channel C, and the second channel D indicate that no scheduling request exists. For example, a state of second acknowledgement information and second scheduling request information sent through the second channel A is (A, A, a scheduling request exists), a state of second acknowledgement information and second scheduling request information sent through the second channel B is (A, A, no scheduling request exists), a state of second acknowledgement information and second scheduling request information sent through the second channel C is (A, N, a scheduling request exists), and a state of second acknowledgement information and second scheduling request information sent through the second channel D is (A, N, no scheduling request exists).

In the foregoing examples, M=1 is used as an example. Actually, a value of M is not limited to 1, and may be a larger value, for example, 2, provided that M is less than N.

For example, a length of a candidate sequence is R. In this case, values of $n_s$ of candidate sequences corresponding to the F second channels are 0, R/F, . . . , and (F−1)R/F. For example, when F=4 and R=12, the values of $n_s$ of the candidate sequences corresponding to the F second channels are 0, 3, 6, and 9. For example, in a slot n, seven candidate sequences correspond to seven cyclic shifts of a root sequence with a length of 12. The seven cyclic shifts include four cyclic shifts "0", "3", "6", and "9". Values of $a_0$ corresponding to candidate sequences that correspond to the four cyclic shifts are 0, and values of $n_s$ are 0, 12/4, 12×2/4, and 12×3/4. States, corresponding to the values "0", "3", "6", and "9" of $n_s$, of acknowledgement information and scheduling request information are (A, A, a scheduling request exists), (A, N, no scheduling request exists), (N, A, no scheduling request exists), and (N, N, no scheduling request exists) respectively. The four states of acknowledgement information and scheduling request information include a case in which a scheduling request exists and a case in which no scheduling request exists.

Further, the value "0" of $n_s$ and the value "6" of $n_s$ may correspond to same scheduling request information, or the value "0" of $n_s$ and the value "3" of $n_s$ may correspond to same scheduling request information, or the value "0" of $n_s$ and the value "9" of $n_s$ may correspond to same scheduling request information.

After candidate sequences corresponding to the cyclic shifts "0", "3", "6", and "9" go through a fading channel, inter-sequence interference is relatively small. If all the four candidate sequences are allocated to one type of scheduling request information, an interval between a cyclic shift corresponding to a case in which a scheduling request exists and a cyclic shift corresponding to a case in which no scheduling request exists may be relatively small. For example, the cyclic shifts "0", "3", "6", and "9" are allocated to states (A, A, no scheduling request exists), (A, N, no scheduling request exists), (N, A, no scheduling request exists), and (N, N, no scheduling request exists) of acknowledgement information and scheduling request information respectively, and cyclic shifts "1", "4", and "7" are allocated to states (A, A, a scheduling request exists), (A, N, a scheduling request exists), and (N, A, a scheduling request exists) of acknowledgement information and scheduling request information respectively. Candidate sequences corresponding to the cyclic shifts "1", "4", and "7" cause relatively strong interference to candidate sequences corresponding to the cyclic shifts "0", "3", and "6", thereby degrading performance of detecting scheduling request information. However, if the cyclic shifts "0". "3", "6", and "9" are allocated to different scheduling request information, performance of detecting scheduling request information can be improved to some extent.

The following describes a state of acknowledgement information and scheduling request information, namely, candidate information, by using an example.

In an example, the second acknowledgement information is acknowledgement information indicating a receiving state of one data block group. In this case, a quantity of bits of the second acknowledgement information is 1. A state of the second acknowledgement information and the second scheduling request information sent through the second channel is (A, a scheduling request exists), or (A, no scheduling request exists), or (N, no scheduling request exists). This can be understood as follows: In this case, N=3, a state of second acknowledgement information and second scheduling request information sent through a second channel A is (A, a scheduling request exists), a state of second acknowledgement information and second scheduling request information sent through a second channel B is (A, no scheduling request exists), and a state of second acknowledgement information and second scheduling request information sent through a second channel C is (A, no scheduling request exists). For example, the terminal sends second acknowledgement information and second scheduling request information by using the second channel B. In this case, the network device can learn, merely by detecting the second channel B, that a state of the second acknowledgement information and the second scheduling request information sent by the terminal is (A, no scheduling request exists). A state of the first acknowledgement information sent through the first channel and the first scheduling request information indicated through the first channel is (N, a scheduling request exists) or (no downlink data scheduling is received (DTX), a scheduling request exists). This may be understood as follows: M=1, and the first channel may indicate two states: (N, a scheduling request exists) and (no downlink data scheduling is received, a scheduling request exists). For the network device, both a case in which N is indicated and a case in which that no downlink data scheduling is received is indicated have practically the same effects. Therefore, one first channel may be used to indicate two states. This can further reduce the quantity of configured first channels. In a state of acknowledgement information and scheduling request information, N indicates a NACK, and A indicates an ACK. When the terminal sends only scheduling request information, it implies that no downlink data scheduling is received (DTX).

In another example, the second acknowledgement information is acknowledgement information indicating a receiving state of one data block group. In this case, a quantity of bits of the second acknowledgement information is 1. A state of the second acknowledgement information and the second scheduling request information sent through the second channel is (A, a scheduling request exists), or (A, no scheduling request exists), or (N, no scheduling request exists), or (N, a scheduling request exists). This may be understood as follows: In this case, N=4, a state of second acknowledgement information and second scheduling request information sent through a second channel A is (A, a scheduling request exists), a state of second acknowledgement information and second scheduling request information sent through a second channel B is (A, no scheduling request exists), a state of second acknowledgement information and second scheduling request information sent through a second channel C is (N, a scheduling request exists), and a state of second acknowledgement information and second scheduling request information sent through a second channel D is (N, no scheduling request exists). A state of the first acknowledgement information sent through the first channel and the first scheduling request information indicated through the first channel is (no downlink data scheduling is received, a scheduling request exists). This may be understood as that M=1. That is, in this example, different channels are used to indicate different states of acknowledgement information and scheduling request information, so that the indication is clearer.

In another example, the second acknowledgement information is acknowledgement information indicating a receiving state of two data block groups. In this case, a quantity of bits of the second acknowledgement information is 2. A state of the second acknowledgement information and the second scheduling request information sent through the second channel is (A, A, a scheduling request exists), or (A, A, no scheduling request exists), or (A, N, a scheduling request exists), or (A, N, no scheduling request exists), or (N, A, a scheduling request exists), or (N, A, no scheduling request exists), or (N, N, no scheduling request exists). This may be understood as follows: In this case, N=7, a state of second acknowledgement information and second scheduling request information sent through a second channel A is (A, A, a scheduling request exists), a state of second acknowledgement information and second scheduling request information sent through a second channel B is (A, A, no scheduling request exists), a state of second acknowledgement information and second scheduling request information sent through a second channel C is (A, N, a scheduling request exists), a state of second acknowledgement information and second scheduling request information sent through a second channel D is (A, N, no scheduling request exists), a state of second acknowledgement information and second scheduling request information sent through a second channel E is (N, A, a scheduling request exists), a state of second acknowledgement information and second scheduling request information sent through a second channel F is (N, A, no scheduling request exists), and a state of second acknowledgement information and second scheduling request information sent through a second channel G is (N, N, no scheduling request exists). A state of the first acknowledgement information sent through the first channel and the first scheduling request information indicated through the first channel is (N, N, a scheduling request exists) or (no downlink data scheduling is received, a scheduling request exists). When no downlink data scheduling is received, the terminal may fail to determine whether one or more data block groups are not scheduled. Therefore, a corresponding state may be (no downlink data scheduling is received). This may be understood as follows: M=1, and the first channel may indicate two states: (N, N, a scheduling request exists) and (no downlink data scheduling is received, a scheduling request exists). Likewise, one first channel is used to indicate two states. This can reduce a quantity of first channels.

In another example, the second acknowledgement information is acknowledgement information indicating a receiving state of two data block groups. In this case, a quantity of bits of the second acknowledgement information is 2. A state of the second acknowledgement information and the second scheduling request information sent through the second channel is (A, A, a scheduling request exists), or (A, A, no scheduling request exists), or (A, N, a scheduling request exists), or (A, N, no scheduling request exists), or (N, A, a scheduling request exists), or (N, A, no scheduling request exists), or (N, N, no scheduling request exists), or (N, N, a scheduling request exists). This may be understood as follows: In this case, N=8, a state of second acknowledgement information and second scheduling request information sent through a second channel A is (A, A, a scheduling request exists), a state of second acknowledgement information and second scheduling request information sent through a second channel B is (A, A, no scheduling request exists), a state of second acknowledgement information and second scheduling request information sent through a second channel C is (A, N, a scheduling request exists), a state of second acknowledgement information and second scheduling request information sent through a second channel D is (A, N, no scheduling request exists), a state of second acknowledgement information and second scheduling request information sent through a second channel E is (N, A, a scheduling request exists), a state of second acknowledgement information and second scheduling request information sent through a second channel F is (N, A, no scheduling request exists), a state of second acknowledgement information and second scheduling request information sent through a second channel G is (N, N, no scheduling request exists), and a state of second acknowledgement information and second scheduling request information sent through a second channel H is (N, N, a scheduling request exists). A state of the first acknowledgement information sent through the first channel and the first scheduling request information indicated through the first channel is (no downlink data scheduling is received, a scheduling request exists). This may be understood as that M=1. That is, in this example, different channels are used to indicate different states of acknowledgement information and scheduling request information, so that the indication is clearer.

A data receiving state is indicated by acknowledgement information, that is, a state of acknowledgement information included in a state of acknowledgement information and scheduling request information may be understood as a data receiving state.

S22. The terminal selects one channel from the M first channels or the N second channels based on generated scheduling request information and acknowledgement information, and sends the selected channel. The network device detects the first channel and/or the second channel, to obtain the scheduling request information and the acknowledgement information that are sent by the terminal.

As described above, different states of scheduling request information and acknowledgement information correspond to different channels. Therefore, after generating the acknowledgement information and scheduling request information, the terminal may select the first mapping relationship of the P mapping relationships, to select a corresponding candidate sequence based on the first mapping relationship and a state of the generated acknowledgement information and scheduling request information. For example, the terminal selects a first sequence, and therefore the terminal may send a channel generated based on the first sequence to the network device, and the network device may receive, by detecting the first channel and/or the second channel, the channel sent by the terminal. The channel generated based on the first sequence is one of the N second channels or one of the M first channels.

Figure 4:
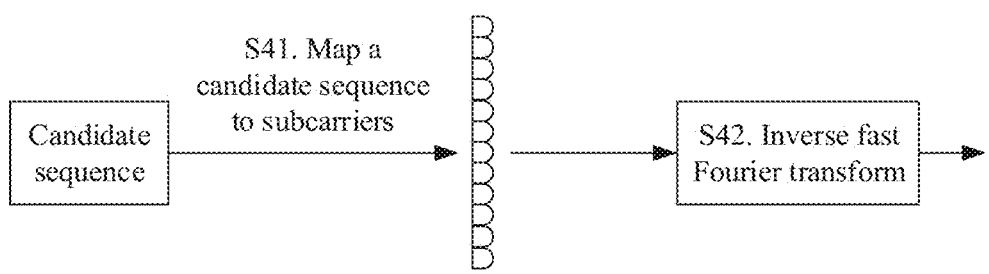
FIG. 4 shows a mapping relationship between a candidate sequence and a subcarrier according to an embodiment of this application.

Usually, by generating a channel based on a candidate sequence, elements of the candidate sequence may be sequentially mapped to subcarriers in a subcarrier group, for example, as shown in FIG. 4.

S41. Map a candidate sequence to subcarriers.

For example, the first element of the candidate sequence may be mapped to the first subcarrier in a subcarrier group, and the second element of the candidate sequence may be mapped to the second subcarrier in the subcarrier group.

S42. Perform inverse fast Fourier transform (IFFT). Alternatively, inverse Fourier transform (IFT) may be performed. In FIG. 4, the inverse fast Fourier transform is used as an example.

Figure 5:
FIG. 5 shows a mapping relationship between a candidate sequence and a subcarrier according to an embodiment of this application.

A to-be-sent signal is generated through the inverse Fourier transform or the inverse fast Fourier transform and is then sent. Subcarriers in the subcarrier group may be consecutive subcarriers shown in FIG. 4 or uniformly spaced subcarriers. As shown in FIG. 5, subcarriers shown in black are subcarriers in the subcarrier group, and the candidate sequence is mapped to the subcarriers shown in black.

Figure 6:
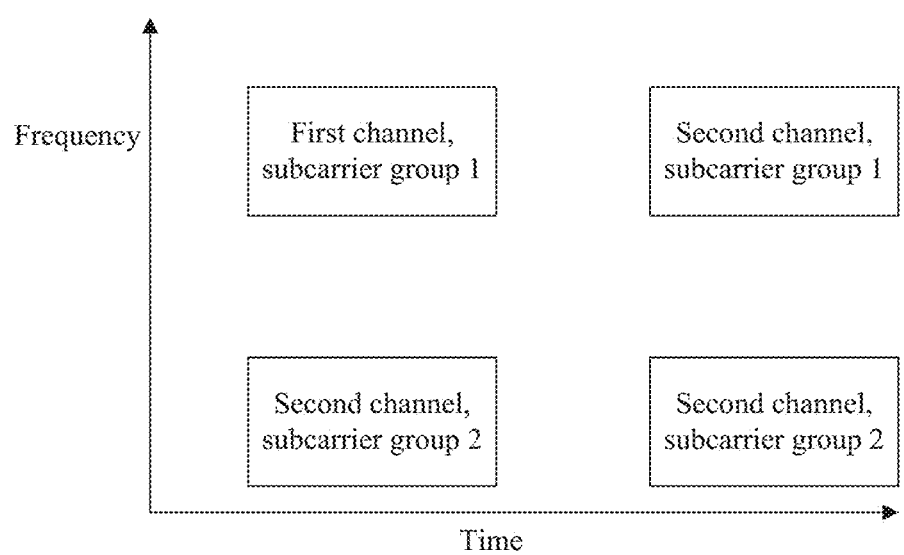
FIG. 6 is a schematic diagram in which a first channel and a second channel occupy different subcarrier groups in one time period according to an embodiment of this application.
Figure 7:
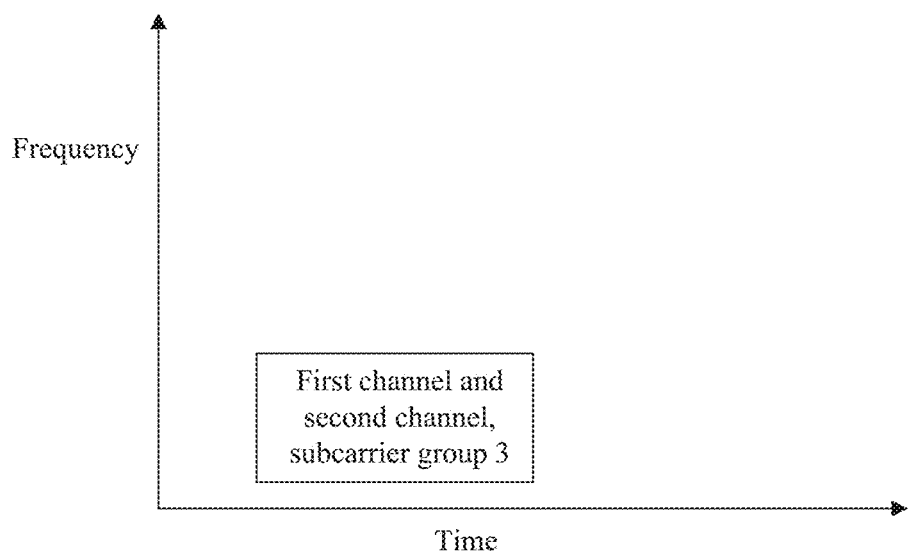
FIG. 7 is a schematic diagram in which a first channel and a second channel occupy a same subcarrier group in one time period according to an embodiment of this application.

As shown in FIG. 6, the first channel and the second channel may occupy different subcarrier groups in one time period. For example, the first channel and the second channel occupy a subcarrier group 1 and a subcarrier group 2. Alternatively, as shown in FIG. 7, the first channel and the second channel may occupy a same subcarrier group in one time period. For example, the first channel and the second channel occupy a subcarrier group 3.

The second channel may occupy a plurality of subcarrier groups in one time period, for example, occupy two subcarrier groups, as shown in FIG. 6. Even if two candidate sequences mapped to two subcarrier groups are the same, two channels generated based on the two candidate sequences are different.

The network device may detect the first channel and/or the second channel, to receive the channel sent by the terminal. The network device may not know a state of the scheduling request information and the acknowledgement information that are fed back by the terminal, and therefore may not know a channel selected by the terminal. Therefore, a relatively reliable manner is that the network device detects both the second channel and the first channel, to avoid missing the information sent by the terminal.

The technical solutions provided in the embodiments of this application help reduce reserved SR resources, so that resource waste can be reduced and resources can be properly utilized to the greatest extent.

The following describes apparatuses corresponding to the foregoing method embodiments with reference to the accompanying drawings.

Figure 8:
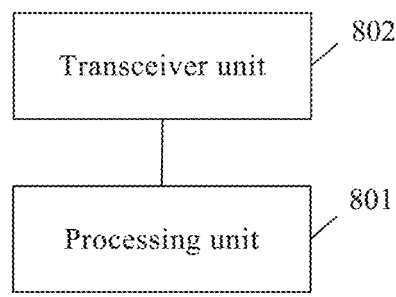
FIG. 8 is a schematic structural diagram of a network device according to an embodiment of this application.

FIG. 8 is a schematic diagram of a network device 800 according to an embodiment of this application. The network device 800 may be applied to the scenario shown in FIG. 1, and is configured to perform the method provided in the embodiment shown in FIG. 2. As shown in FIG. 8, the network device 800 includes a processing unit 801 and a transceiver unit 802. The transceiver unit 802 may be specifically configured to perform various information sending/receiving that is performed by the network device in the embodiment shown in FIG. 2. The processing unit 801 is specifically configured to perform processing other than the information sending/receiving of the network device in the embodiment shown in FIG. 2.

For example, the transceiver unit 802 may be configured to: when the network device has configured a first channel in a first time unit for a terminal, indicate N second channels in the first time unit to the terminal by using a downlink control channel, where the second channel is used to send second acknowledgement information and second scheduling request information in the first time unit, a quantity of first channels is M, M+N is greater than or equal to 2×B, M is a positive integer, M is less than N, the second acknowledgement information is an element in a second acknowledgement information set, B is a quantity of elements in the second acknowledgement information set, the second scheduling request information indicates that a scheduling request exists or no scheduling request exists, the second acknowledgement information set includes acknowledgement information indicating a data receiving state, any one of the M first channels is different from any one of the N second channels, there is a time-domain overlapping part between a time-frequency resource of the first channel and a time-frequency resource of the second channel in the first time unit, the first channel is used to indicate first scheduling request information in the first time unit, or the first channel is used to indicate the first scheduling request information and send first acknowledgement information in the first time unit, the first scheduling request information indicates that a scheduling request exists or no scheduling request exists, the first acknowledgement information is an element in a first acknowledgement information set, and the first acknowledgement information set includes acknowledgement information indicating a data receiving state. The processing unit 801 may be configured to detect the first channel and/or the second channel.

For specific content, refer to descriptions of a related part in the embodiment shown in FIG. 2. Details are not described herein again.

Figure 9:
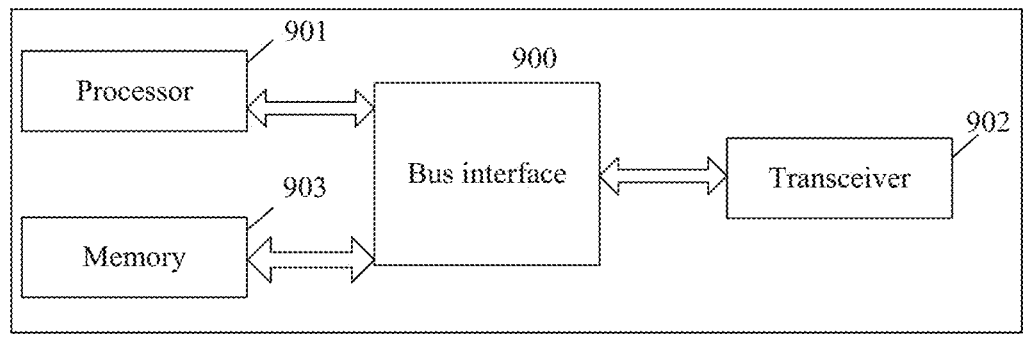
FIG. 9 is a schematic structural diagram of another network device according to an embodiment of this application.

It should be understood that the unit division is merely logical function division. In actual implementation, all or some of the units may be integrated into one physical entity, or may be physically separate. In this embodiment of this application, the transceiver unit 802 may be implemented by a transceiver, and the processing unit 801 may be implemented by a processor. As shown in FIG. 9, a network device 900 may include a processor 901, a transceiver 902, and a memory 903. The memory 903 may be configured to store a program/code that is pre-installed on the network device 900 upon delivery, or may store code to be executed by the processor 901, or the like.

It should be understood that the network device 900 according to this embodiment of this application may correspond to the network device in the embodiment shown in FIG. 2 in the embodiments of this application, the transceiver 902 is configured to perform various information sending/receiving that is performed by the network device in the embodiment shown in FIG. 2, and the processor 901 is configured to perform processing other than the information sending/receiving of the network device in the embodiment shown in FIG. 2. Details are not described herein.

Figure 10:
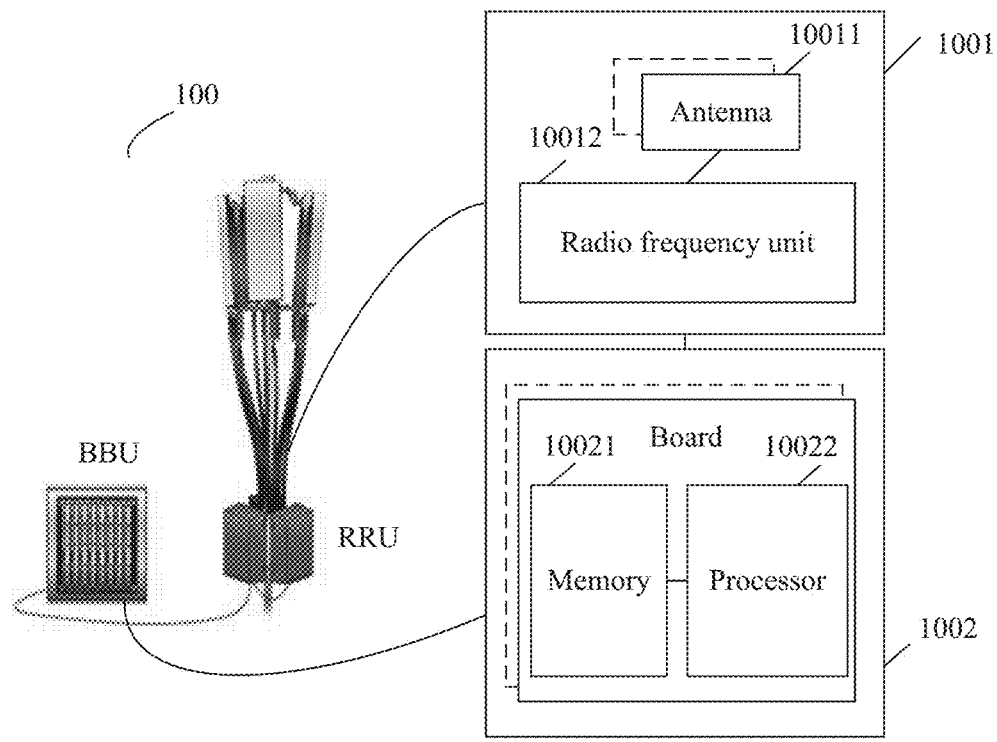
FIG. 10 is a schematic structural diagram of another network device according to an embodiment of this application.

FIG. 10 is a schematic structural diagram of a network device 100. For example, the network device 100 may be a base station. The network device 100 may be applied to the scenario shown in FIG. 1, and is configured to perform the method provided in the embodiment shown in FIG. 2. The network device 100 includes one or more remote radio units (RRU) 1001 and one or more baseband units (BBU) 1002. The RRU 1001 may be referred to as a transceiver unit, a transceiver, a transceiver circuit, a transceiver device, or the like. The RRU 1001 may include at least one antenna 10011 and a radio frequency unit 10012. The RRU 1001 is mainly configured to send/receive a radio frequency signal and perform conversion between a radio frequency signal and a baseband signal, for example, is configured to perform various information sending/receiving that is performed by the network device in the embodiment shown in FIG. 2. The BBU 1002 is mainly configured to perform baseband processing, control the network device, and the like. The RRU 1001 and the BBU 1002 may be physically disposed together, or may be physically disposed separately, for example, may be a distributed base station.

The BBU 1002 is a control center of the network device, may also be referred to as a processing unit, and is mainly configured to perform baseband processing functions, for example, channel encoding, multiplexing, modulation, and spectrum spreading. For example, the BBU (processing unit) may be configured to control the network device to perform processing other than the information sending/receiving in the embodiment shown in FIG. 2.

In an example, the BBU 1002 may include one or more boards. A plurality of boards may support a radio access network (for example, an LTE network) of a single access standard, or may support radio access networks of different access standards. The BBU 1002 further includes a memory 10021 and a processor 10022. The memory 10021 is configured to store necessary instructions and data. The processor 10022 is configured to control the network device to perform necessary actions, for example, is configured to control the network device to perform processing other than the information sending/receiving in the embodiment shown in FIG. 2. The memory 10021 and the processor 10022 may serve one or more boards. In other words, a memory and a processor may be disposed on each board separately, or a plurality of boards may use a same memory and processor. In addition, a necessary circuit is further disposed on each board.

Figure 11:
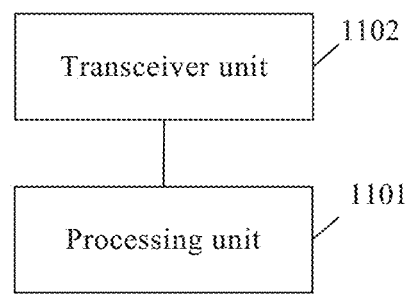
FIG. 11 is a schematic structural diagram of a terminal device according to an embodiment of this application.

FIG. 11 is a schematic diagram of a terminal 1100 according to an embodiment of this application. The terminal 1100 may be applied to the scenario shown in FIG. 1, and is configured to perform the method shown in FIG. 2. As shown in FIG. 11, the terminal 1100 includes a processing unit 1101 and a transceiver unit 1102. The transceiver unit 1102 may be specifically configured to perform various information sending/receiving that is performed by the terminal in the embodiment shown in FIG. 2. The processing unit 1101 is specifically configured to perform processing other than the information sending/receiving of the terminal in the embodiment shown in FIG. 2.

For example, the processing unit 1101 is configured to: when a network device has configured a first channel in a first time unit for the terminal, determine, by using a downlink control channel, N second channels in the first time unit that are indicated by the network device to the terminal, where the second channel is used to send second acknowledgement information and second scheduling request information in the first time unit, a quantity of first channels is M, M+N is greater than or equal to 2×B, M is less than N, the second acknowledgement information is an element in a second acknowledgement information set, B is a quantity of elements in the second acknowledgement information set, the second scheduling request information indicates that a scheduling request exists or no scheduling request exists, the second acknowledgement information set includes acknowledgement information indicating a data receiving state, any one of the M first channels is different from any one of the N second channels, there is a time-domain overlapping part between a time-frequency resource of the first channel and a time-frequency resource of the second channel in the first time unit, the first channel is used to indicate first scheduling request information in the first time unit, or the first channel is used to indicate the first scheduling request information and send first acknowledgement information in the first time unit, M is a positive integer, the first scheduling request information indicates that a scheduling request exists or no scheduling request exists, the first acknowledgement information is an element in a first acknowledgement information set, and the first acknowledgement information set includes acknowledgement information indicating a data receiving state; and configured to select one channel from the M first channels or the N second channels based on generated scheduling request information and acknowledgement information. The transceiver unit 1102 is configured to send the channel selected by the processing unit 1101.

For specific content, refer to specific descriptions of the embodiment shown in FIG. 2. Details are not described herein again.

Figure 12:
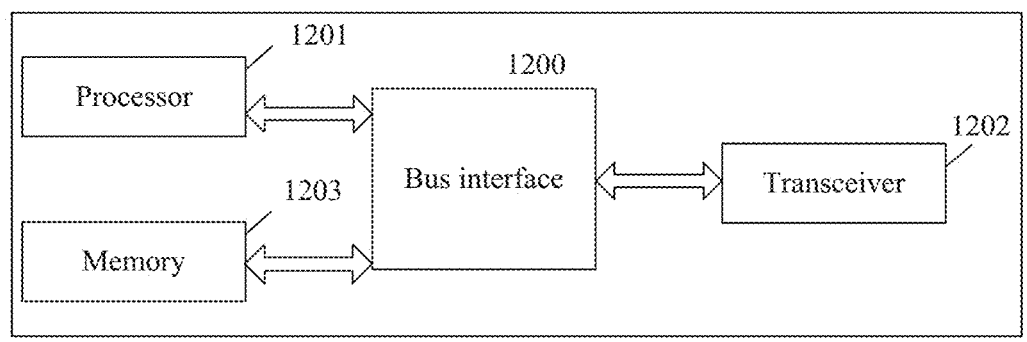
FIG. 12 is a schematic structural diagram of another terminal device according to an embodiment of this application.

It should be understood that the unit division is merely logical function division. In actual implementation, all or some of the units may be integrated into one physical entity, or may be physically separate. In this embodiment of this application, the transceiver unit 1102 may be implemented by a transceiver, and the processing unit 1101 may be implemented by a processor. As shown in FIG. 12, a terminal 1200 may include a processor 1201, a transceiver 1202, and a memory 1203. The memory 1203 may be configured to store a program/code that is pre-installed on the terminal 1200 upon delivery, or may store code to be executed by the processor 1201, or the like.

It should be understood that the terminal 1200 according to this embodiment of this application may correspond to the terminal in the embodiment shown in FIG. 2 in the embodiments of this application, the transceiver 1202 is configured to perform various information sending/receiving that is performed by the terminal in the embodiment shown in FIG. 2, and the processor 1201 is configured to perform processing other than the information sending/receiving of the terminal in the embodiment shown in FIG. 2. Details are not described herein.

Figure 13:
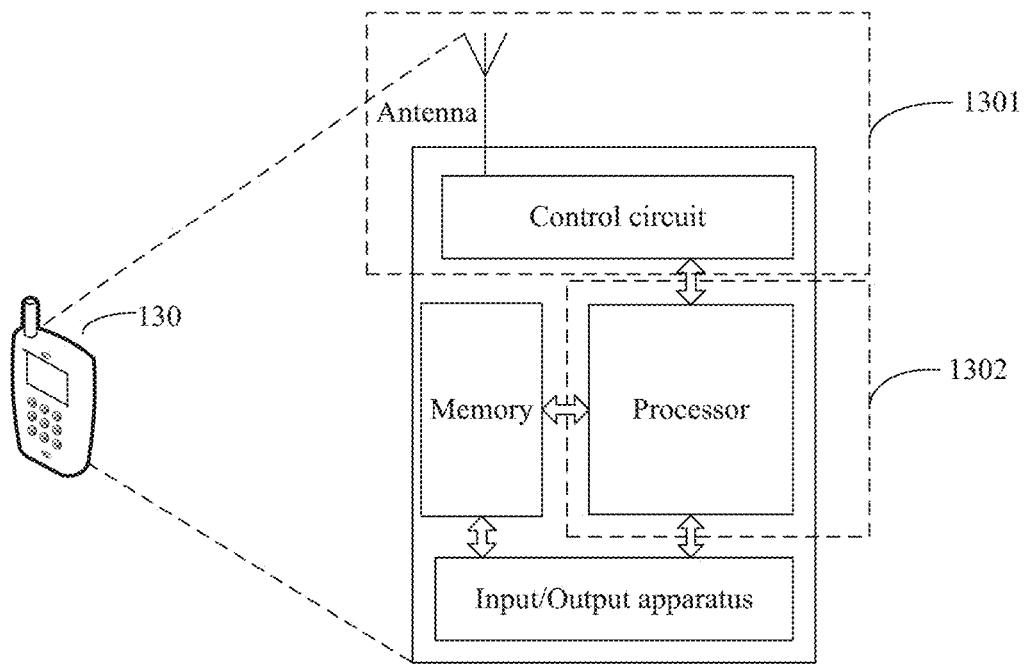
FIG. 13 is a schematic structural diagram of another terminal device according to an embodiment of this application.

FIG. 13 is a schematic structural diagram of a terminal. The terminal may be applied to the scenario shown in FIG. 1, to perform the method provided in the embodiment shown in FIG. 2. For ease of description, FIG. 13 shows merely main components of the terminal. As shown in FIG. 13, the terminal 130 includes a processor, a memory, a control circuit, an antenna, and an input/output apparatus. The control circuit is mainly configured to perform conversion between a baseband signal and a radio frequency signal, and process a radio frequency signal. The control circuit and the antenna together may also be referred to as a transceiver device, are mainly configured to send/receive a radio frequency signal in a form of an electromagnetic wave, and receive a signaling instruction and/or a reference signal sent by a base station, and are configured to perform various information sending/receiving that is performed by the terminal in the embodiment shown in FIG. 2. For details, refer to descriptions in the foregoing related part. The processor is mainly configured to process a communication protocol and communication data, control the entire terminal, execute a software program, and process data of the software program, for example, is configured to support the terminal in performing actions other than the information sending/receiving in the embodiment shown in FIG. 2. The memory is mainly configured to store the software program and data. The input/output apparatus, for example, a touchscreen, a display screen, or a keyboard, is mainly configured to receive data entered by a user, and output data to the user.

After the terminal is powered on, the processor may read the software program in scenario, interpret and execute instructions of the software program, and process the data of the software program. When data needs to be sent wirelessly, the processor performs baseband processing on the to-be-sent data, and outputs a baseband signal to a radio frequency circuit. The radio frequency circuit performs radio frequency processing on the baseband signal, and sends a radio frequency signal in a form of an electromagnetic wave through the antenna. When data is sent to the terminal, the radio frequency circuit receives a radio frequency signal through the antenna, converts the radio frequency signal into a baseband signal, and outputs the baseband signal to the processor. The processor converts the baseband signal into data, and processes the data.

Persons skilled in the art may understand that for ease of description, FIG. 13 shows merely one memory and one processor. In actual user equipment, there may be a plurality of processors and memories. The memory may also be referred to as a storage medium, a storage device, or the like. This is not limited in this embodiment of this application.

In an optional implementation, the processor may include a baseband processor and a central processing unit. The baseband processor is mainly configured to process a communication protocol and communication data. The central processing unit is mainly configured to control the entire terminal, execute a software program, and process data of the software program. The processor in FIG. 13 integrates functions of the baseband processor and the central processing unit. Persons skilled in the art may understand that the baseband processor and the central processing unit may be alternatively independent processors that are interconnected by using a bus or another technology. Persons skilled in the art may understand that the terminal may include a plurality of baseband processors to adapt to different network standards, the terminal may include a plurality of central processing units to enhance a processing capability of the terminal, and various components of the terminal may be connected through various buses. The baseband processor may also be expressed as a baseband processing circuit or a baseband processing chip. The central processing unit may also be expressed as a central processing circuit or a central processing chip. A function of processing a communication protocol and communication data may be embedded in the processor, or may be stored in the storage unit in a form of a software program, and the processor executes the software program to implement a baseband processing function.

For example, in this embodiment of this application, the antenna and the control circuit that have a sending/receiving function may be considered as a transceiver unit 1301 of the terminal 130, and the processor with a processing function is considered as a processing unit 1302 of the terminal 130. As shown in FIG. 13, the terminal 130 includes the transceiver unit 1301 and the processing unit 1302. The transceiver unit may also be referred to as a transceiver device, a transceiver, a transceiver apparatus, or the like. Optionally, a device that is in the transceiver unit 1301 and that is configured to implement a receiving function may be considered as a receiving unit, and a device that is in the transceiver unit 1301 and that is configured to implement a sending function is considered as a sending unit. In other words, the transceiver unit 1301 includes the receiving unit and the sending unit. For example, the receiving unit may also be referred to as a receiving device, a receiver, a receiving circuit, or the like, and the sending unit may be referred to as a transmission device, a transmitter, a transmission circuit, or the like.

In this embodiment of this application, the transceiver may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network transceiver, a cellular network transceiver, or a combination thereof. The processor may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof. The memory may include a volatile memory, for example, a random access memory (RAM); or the memory may include a non-volatile memory (English: non-volatile memory), for example, a read-only memory (ROM), a flash memory, a hard disk drive (HDD), or a solid-state drive (SSD): or the memory may include a combination of the foregoing types of memories.

FIG. 5 and FIG. 8 may further include a bus interface. The bus interface may include any quantity of interconnected buses and bridges. Specifically, various circuits of one or more processors represented by the processor and memories represented by the memory are linked together. The bus interface may further link various other circuits together, for example, a peripheral device, a voltage regulator, and a power management circuit. These are well known in the art, and therefore are not further described in this specification. The bus interface provides an interface. The transceiver provides a unit configured to communicate with various other devices on a transmission medium. The processor is responsible for managing a bus architecture and general processing. The memory may store data used when the processor performs operations.

Figure 14A:
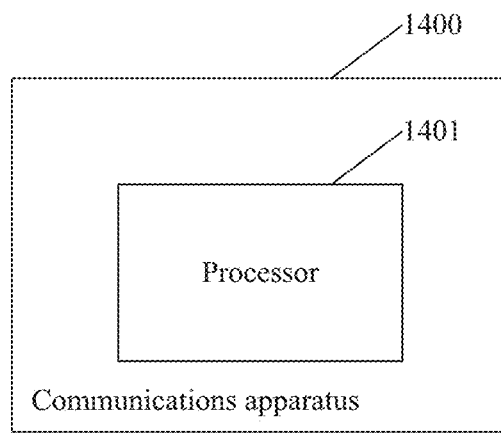
FIG. 14A is a schematic structural diagram of a communications apparatus according to an embodiment of this application.

FIG. 14A is a schematic structural diagram of a communications apparatus 1400. The communications apparatus 1400 can implement functions of the terminal device in the foregoing descriptions. The communications apparatus 1400 may include a processor 1401. The processor 1401 may be configured to perform various functions that are performed by the terminal in the embodiment shown in FIG. 2, and/or configured to support other processes of the technologies described in this specification. For function descriptions of corresponding functional modules, refer to all related content of the steps in the foregoing method embodiments. Details are not described herein again.

The communications apparatus 1400 may be a field-programmable gate array (FPGA), an application-specific integrated circuit (ASIC), a system on chip (SoC), a central processing unit (CPU), a network processor (NP), a digital signal processor (DSP), or a micro controller unit (MCU); or may be a programmable logic device (PLD) or another integrated chip. The communications apparatus 1400 may be disposed in the terminal device in the embodiments of this application, so that the terminal device implements the communication method provided in the embodiments of this application.

Figure 14B:
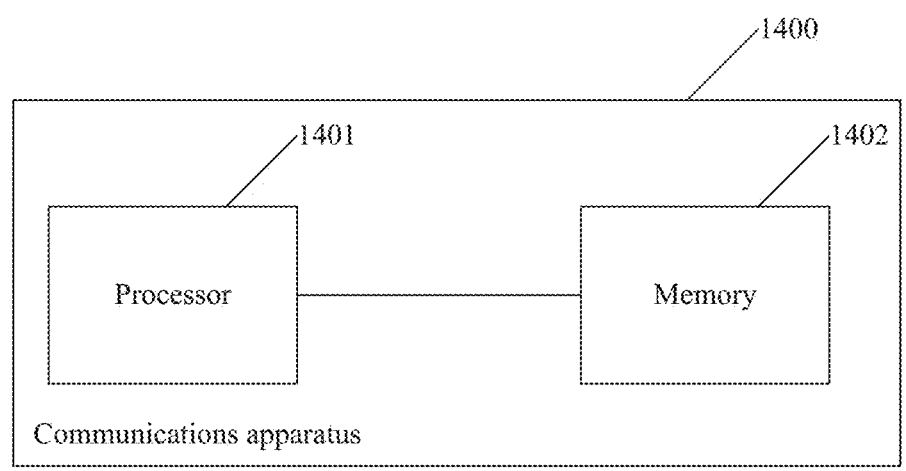
FIG. 14B is a schematic structural diagram of a communications apparatus according to an embodiment of this application.

In an optional implementation, the communications apparatus 1400 may further include a memory 1402. Refer to FIG. 14B. The memory 1402 is configured to store computer programs or instructions. The processor 1401 is configured to decode and execute these computer programs or instructions. It should be understood that these computer programs or instructions may include functional programs of the foregoing terminal device. When the functional programs of the terminal device are decoded and executed by the processor 1401, the communications apparatus 1400 can be enabled to implement the functions of the terminal device in the communication method in the embodiments of this application.

In another optional implementation, these functional programs of the terminal device are stored in an external memory of the communications apparatus 1400. When the functional programs of the terminal device are decoded and executed by the processor 1401, the memory 1402 temporarily stores some or all content of the functional programs of the terminal device.

In another optional implementation, these functional programs of the terminal device are set in the internal memory 1402 of the communications apparatus 1400. When the internal memory 1402 of the communications apparatus 1400 stores the functional programs of the terminal device, the communications apparatus 1400 may be disposed in the terminal device in the embodiments of this application.

In still another optional implementation, some content of these functional programs of the terminal device is stored in an external memory of the communications apparatus 1400, and the remaining content of these functional programs of the terminal device is stored in the internal memory 1402 of the communications apparatus 1400.

Persons skilled in the art may further understand that various illustrative logical blocks and steps that are listed in the embodiments of this application may be implemented by using electronic hardware, computer software, or a combination thereof whether the functions are implemented by using hardware or software depends on particular applications and a design requirement of the entire system. Persons skilled in the art may use various methods to implement the described functions for each particular application, but it should not be considered that the implementation goes beyond the scope of the embodiments of this application.

Various illustrative logic units and circuits described in the embodiments of this application may be implemented or may operate the described functions by using a design of a general-purpose processor, a digital signal processor, an ASIC, an FPGA or another programmable logic apparatus, a discrete gate or transistor logic, a discrete hardware component, or any combination thereof. The general-purpose processor may be a microprocessor. Optionally, the general-purpose processor may also be any conventional processor, controller, microcontroller, or state machine. The processor may also be implemented by a combination of computing apparatuses, for example, a digital signal processor and a microprocessor, a plurality of microprocessors, one or more microprocessors with a digital signal processor core, or any other similar configuration.

Steps of the methods or algorithms described in the embodiments of this application may be directly embedded into hardware, a software unit executed by a processor, or a combination thereof. The software unit may be stored in a RAM, a flash memory, a ROM, an EPROM, an EEPROM, a register, a hard disk, a removable magnetic disk, a CD-ROM, or any other form of storage medium in the art. For example, the storage medium may be connected to a processor so that the processor may read information from the storage medium and write information into the storage medium. Optionally, the storage medium may be alternatively integrated into a processor. The processor and the storage medium may be disposed in an ASIC, and the ASIC may be disposed in UE. Optionally, the processor and the storage medium may be alternatively disposed in different components of UE.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, all or some of the procedures or functions according to the embodiments of this application are generated. The computer may be a general-purpose computer, a special-purpose computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

The embodiments in this specification are all described in a progressive manner, for same or similar parts in the embodiments, refer to these embodiments, and each embodiment focuses on a difference from other embodiments. Especially, apparatus and system embodiments are basically similar to the method embodiments, and therefore are described briefly. For related parts, refer to descriptions in the method embodiments.

According to the foregoing descriptions of this specification in this application, technologies in the art may use or implement the content of this application. Any modification based on the disclosed content shall be considered obvious in the art. The basic principles described in this application may be applied to other variations without departing from the essence and scope of this application. Therefore, the content disclosed in this application is not limited to the described embodiments and designs but may also be extended to a maximum scope that is consistent with the principles and disclosed new features of this application.

What is claimed is:

1. A communication method, comprising:
configuring, by a network device, M first channels in a first time unit for a terminal;
indicating, by the network device, N second channels in the first time unit to the terminal by using a downlink control channel, wherein the N second channels are used by the terminal to send second acknowledgement information and second scheduling request information in the first time unit, M+N is greater than or equal to 2×B, M is a positive integer, N is a positive integer, B is a positive integer, M is less than N, the second acknowledgement information is an element in a second acknowledgement information set, B is a quantity of elements in the second acknowledgement information set, the second scheduling request information indicates that a scheduling request exists or no scheduling request exists, the second acknowledgement information set comprises acknowledgement information indicating a data receiving state, any one of the M first channels is different from any one of the N second channels, and there is a time-domain overlapping part between a time-frequency resource of at least one of the M first channels and a time-frequency resource of at least one of the N second channels in the first time unit; and wherein the M first channels are used by the terminal to send first scheduling request information in the first time unit, or the M first channels are used by the terminal to send the first scheduling request information and first acknowledgement information in the first time unit, the first scheduling request information indicates that a scheduling request exists or no scheduling request exists, the first acknowledgement information is an element in a first acknowledgement information set, and the first acknowledgement information set comprises acknowledgement information indicating a data receiving state; and detecting, by the network device, at least one of the M first channels or one of the N second channels that is transmitted by the terminal.

2. The method according to claim 1, wherein the second acknowledgement information set is {N, A} or {(N, N), (N, A), (A, N), (A, A)}, N indicates a negative acknowledgement (NACK), and A indicates an acknowledgement (ACK).

3. The method according to claim 1, wherein the first acknowledgement information set is {N} or {(N, N)}, and N indicates a negative acknowledgement (NACK).

4. The method according to claim 1, wherein M=1.

5. The method according to claim 1, wherein the configuring, by the network device, the M first channels for the terminal comprises:

configuring, by the network device, the M first channels for the terminal by using higher layer signaling.

6. The method according to claim 1, wherein each of the N second channels or the M first channels in a subcarrier group is a channel generated based on a candidate sequence that is generated according to the following formula:

$$y_{s,i}=e^{(a_0+n_s)\cdot 2\pi\cdot j\cdot i/R}\cdot x_i, i=0,1,2,\ldots,R-1$$

wherein R is a length of the candidate sequence, R is a positive integer, $\{x_i|i=0, 1, 2, \ldots, R-1\}$ is a sequence, $a_0+n_s$ is a cyclic shift of the candidate sequence $y_{s,i}$, $a_0$ is an initial cyclic shift, $a_0$ is a real number, $n_s$ is a dedicated cyclic shift, $n_s$ is a real number, s is an indicator for indicating a sequence, and j is an imaginary unit.

7. The method according to claim 6, further comprising:
determining, by the network device, a first mapping relationship of P mapping relationships, wherein
each of the P mapping relationships comprises a mapping relationship between N+M pieces of candidate information and N+M candidate sequences; and
the P mapping relationships further comprise a second mapping relationship, and values of $n_s$ in the first mapping relationship and the second mapping relationship used to generate candidate sequences corresponding to same candidate information are different mod R, wherein mod indicates a modulo operation.

8. The method according to claim 6, wherein the length of the candidate sequence is R, the N second channels comprise F second channels, values of $n_s$ of candidate sequences corresponding to the F second channels are 0, R/F, ..., and (F−1)R/F, a first part of channels of the F second channels indicate that a scheduling request exists, and a second part of channels of the F second channels indicate that no scheduling request exists.

9. The method according to claim 8, wherein when R=12, the F second channels are corresponding channels when values of $n_s$ are 0, 3, 6, and 9, wherein the value "0" of $n_s$ and the value "6" of $n_s$ correspond to same scheduling request information, or the value "0" of $n_s$ and the value "3" of $n_s$ correspond to same scheduling request information, or the value "0" of $n_s$ and the value "9" of $n_s$ correspond to same scheduling request information.

10. The method according to claim 1, wherein
a state of the first acknowledgement information and the first scheduling request information is (N, a scheduling request exists) or (no downlink data scheduling is received, a scheduling request exists), and a state of the second scheduling request information and the second acknowledgement information is (A, a scheduling request exists), or (A, no scheduling request exists), or (N, no scheduling request exists); or
a state of the first acknowledgement information and the first scheduling request information is (no downlink data scheduling is received, a scheduling request exists), and a state of the second scheduling request information and the second acknowledgement information is (A, a scheduling request exists), or (A, no scheduling request exists), or (N, no scheduling request exists), or (N, a scheduling request exists); or
a state of the first acknowledgement information and the first scheduling request information is (N, N, a scheduling request exists) or (no downlink data scheduling is received, a scheduling request exists), and a state of the second scheduling request information and the second acknowledgement information is (A, A, a scheduling request exists), or (A, A, no scheduling request exists), or (A, N, a scheduling request exists), or (A, N, no scheduling request exists), or (N, A, a scheduling request exists), or (N, A, no scheduling request exists), or (N, N, no scheduling request exists); or
a state of the first acknowledgement information and the first scheduling request information is (no downlink data scheduling is received, a scheduling request exists), and a state of the second scheduling request information and the second acknowledgement information is (A, A, a scheduling request exists), or (A, A, no scheduling request exists), or (A, N, a scheduling request exists), or (A, N, no scheduling request exists), or (N, A, a scheduling request exists), or (N, A, no scheduling request exists), or (N, N, no scheduling request exists), or (N, N, a scheduling request exists), wherein
N indicates a NACK, and A indicates an ACK.

11. A communication method, comprising:
determining, by a terminal, M first channels that are configured for the terminal in a first time unit;
determining, by the terminal, N second channels in the first time unit that are indicated by a network device to the terminal by using a downlink control channel, wherein the N second channels are used by the terminal to send second acknowledgement information and second scheduling request information in the first time unit, a M+N is greater than or equal to 2×B, M is a positive integer, N is a positive integer, B is a positive integer, M is less than N, the second acknowledgement information is an element in a second acknowledgement information set, B is a quantity of elements in the second acknowledgement information set, the second scheduling request information indicates that a scheduling request exists or no scheduling request exists, the second acknowledgement information set comprises acknowledgement information indicating a data receiving state, any one of the M first channels is different from any one of the N second channels, and there is a time-domain overlapping part between a time-frequency resource of at least one of the M first channels and a time-frequency resource of at least one of the N second channels in the first time unit; and
wherein the M first channels are used by the terminal to send first scheduling request information in the first time unit, or the M first channels are used by the terminal to send the first scheduling request information and first acknowledgement information in the first time unit, the first scheduling request information indicates that a scheduling request exists or no scheduling request exists, the first acknowledgement information is an element in a first acknowledgement information set, and the first acknowledgement information set comprises acknowledgement information indicating a data receiving state;
selecting, by the terminal, one channel from the M first channels or the N second channels based on generated scheduling request information and acknowledgement information; and
sending the selected channel.

12. The method according to claim 11, wherein the second acknowledgement information set is {N, A} or {(N, N), (N, A), (A, N), (A, A)}, N indicates a negative acknowledgement (NACK), and A indicates an acknowledgement (ACK).

13. The method according to claim 11, wherein the first acknowledgement information set is {N} or {(N, N)}, and N indicates a negative acknowledgement NACK.

14. The method according to claim 11, wherein M=1.

15. The method according to claim 11, wherein the determining, by the terminal, the M first channels comprises:
   determining, by the terminal by receiving higher layer signaling, the M first channels for the terminal.

16. The method according to claim 11, wherein each of the N second channels or the M first channels in a subcarrier group is a channel generated based on a candidate sequence that is generated according to the following formula:

$$y_{s,i} = e^{(a_0+n_s)\cdot 2\pi\cdot j\cdot i\cdot i/R}\cdot x_i, i=0,1,2,\ldots,R-1$$

wherein R is a length of the candidate sequence, R is a positive integer, $\{x_i|i=0, 1, 2, \ldots, R-1\}$ is a sequence, $a_0+n_s$ is a cyclic shift of the candidate sequence $y_{s,i}$, $a_0$ is an initial cyclic shift, $a_0$ is a real number, $n_s$ is a dedicated cyclic shift, $n_s$ is a real number, s is an indicator for indicating a sequence, and j is an imaginary unit.

17. The method according to claim 16, further comprising:
   determining, by the terminal, a first mapping relationship of P mapping relationships, wherein each of the P mapping relationships comprises a mapping relationship between N+M pieces of candidate information and N+M candidate sequences; and
   the P mapping relationships further comprise a second mapping relationship, and values of $n_s$ that is in the first mapping relationship and the second mapping relationship and that is used to generate candidate sequences corresponding to same candidate information are different mod R, wherein mod indicates a modulo operation.

18. The method according to claim 16, wherein the length of the candidate sequence is R, the N second channels comprise F second channels, values of $n_s$ of candidate sequences corresponding to the F second channels are 0, R/F, . . . , and (F−1)R/F, a first part of channels of the F second channels indicate that a scheduling request exists, a second part of channels of the F second channels indicate that no scheduling request exists, and F is an integer greater than 1.

19. The method according to claim 18, wherein
   when R=12, the F second channels are corresponding channels when values of $n_s$ are 0, 3, 6, and 9, wherein the value "0" of $n_s$ and the value "6" of $n_s$ correspond to same scheduling request information, or the value "0" of $n_s$ and the value "3" of $n_s$ correspond to same scheduling request information, or the value "0" of $n_s$ and the value "9" of $n_s$ correspond to same scheduling request information.

20. The method according to claim 11, wherein
   a state of the first acknowledgement information and the first scheduling request information is (N, a scheduling request exists) or (no downlink data scheduling is received, a scheduling request exists), and a state of the second scheduling request information and the second acknowledgement information is (A, a scheduling request exists), or (A, no scheduling request exists), or (N, no scheduling request exists); or
   a state of the first acknowledgement information and the first scheduling request information is (no downlink data scheduling is received, a scheduling request exists), and a state of the second scheduling request information and the second acknowledgement information is (A, a scheduling request exists), or (A, no scheduling request exists), or (N, no scheduling request exists), or (N, a scheduling request exists); or
   a state of the first acknowledgement information and the first scheduling request information is (N, N, a scheduling request exists) or (no downlink data scheduling is received, a scheduling request exists), and a state of the second scheduling request information and the second acknowledgement information is (A, A, a scheduling request exists), or (A, A, no scheduling request exists), or (A, N, a scheduling request exists), or (A, N, no scheduling request exists), or (N, A, a scheduling request exists), or (N, A, no scheduling request exists), or (N, N, no scheduling request exists); or
   a state of the first acknowledgement information and the first scheduling request information is (no downlink data scheduling is received, a scheduling request exists), and a state of the second scheduling request information and the second acknowledgement information is (A, A, a scheduling request exists), or (A, A, no scheduling request exists), or (A, N, a scheduling request exists), or (A, N, no scheduling request exists), or (N, A, a scheduling request exists), or (N, A, no scheduling request exists), or (N, N, no scheduling request exists), or (N, N, a scheduling request exists), wherein
N indicates a NACK, and A indicates an ACK.

* * * * *